US012756106B2

(12) United States Patent
Jolani et al.

(10) Patent No.: US 12,756,106 B2
(45) Date of Patent: Oct. 6, 2026

(54) ANTENNA HAVING A SPATIAL BANDPASS STRUCTURE AND PARASITIC RADIATOR

(71) Applicant: Galtronics USA, INC., Tempe, AZ (US)

(72) Inventors: Farid Jolani, Frisco, TX (US); Abdolmehdi Dadgarpour, Kanata (CA); Sadegh Farzaneh, Kanata (CA); Behnam Zarghooni, Kanata (CA); Jacob Van Beek, Kanata (CA)

(73) Assignee: Galtronics USA, INC., Tempe, AZ (US)

( * ) Notice: Subject to any disclaimer, the term of this patent is extended or adjusted under 35 U.S.C. 154(b) by 0 days.

(21) Appl. No.: 18/482,111

(22) Filed: Oct. 6, 2023

(65) Prior Publication Data

US 2024/0145936 A1 May 2, 2024

Related U.S. Application Data

(60) Provisional application No. 63/378,650, filed on Oct. 6, 2022.

(51) Int. Cl.
*H01Q 15/00* (2006.01)
*H01Q 1/24* (2006.01)
(Continued)

(52) U.S. Cl.
CPC ......... *H01Q 15/0053* (2013.01); *H01Q 1/246* (2013.01); *H01Q 1/523* (2013.01);
(Continued)

(58) Field of Classification Search
CPC .......... H01Q 1/246; H01Q 1/52; H01Q 1/521; H01Q 1/523; H01Q 5/321; H01Q 5/378;
(Continued)

(56) References Cited

U.S. PATENT DOCUMENTS

2020/0067197 A1 2/2020 Tang et al.
2021/0242603 A1 8/2021 Tang et al.
(Continued)

OTHER PUBLICATIONS

Sun HH, C. Ding, H. Zhu, B. Jones, and Y. J. Guo, "Suppression of crossband scattering in multiband antenna arrays," IEEE Trans. Antennas Propag., vol. 67, No. 4, pp. 2379-2389, Jan. 10, 2019. doi: 10.1109/TAP.2019.2891707.
(Continued)

*Primary Examiner* — Robert Karacsony
(74) *Attorney, Agent, or Firm* — Burr & Forman

(57) ABSTRACT

An antenna comprising a plurality of spatial bandpass structures, wherein each spatial bandpass structures comprises an LC resonator having at least one parasitic patch disposed within a loop of the resonator. The plurality of spatial bandpass structures is positioned around a central section of the antenna. In some embodiments, each spatial bandpass structure is embedded in a radiating arm of an antenna. In some embodiments, the central section comprises at least one radiator. In some embodiments, the antenna further comprises at least one parasitic radiator disposed between two spatial bandpass structures. In other embodiments, the antenna has only one spatial bandpass structure, and/or is configured unevenly (i.e., such that different sides of the antenna are configured differently).

10 Claims, 29 Drawing Sheets

(51) Int. Cl.

| | |
|---|---|
| ***H01Q 1/52*** | (2006.01) |
| ***H01Q 5/385*** | (2015.01) |
| ***H01Q 5/42*** | (2015.01) |
| ***H01Q 5/48*** | (2015.01) |
| ***H01Q 19/10*** | (2006.01) |
| ***H01Q 21/26*** | (2006.01) |
| ***H01Q 25/00*** | (2006.01) |

(52) U.S. Cl.
CPC ............... *H01Q 5/385* (2015.01); *H01Q 5/42* (2015.01); *H01Q 5/48* (2015.01); *H01Q 19/108* (2013.01); *H01Q 21/26* (2013.01); *H01Q 25/001* (2013.01)

(58) Field of Classification Search
CPC .......... H01Q 5/385; H01Q 5/392; H01Q 5/40; H01Q 5/42; H01Q 5/48; H01Q 5/49; H01Q 15/0006; H01Q 15/0013; H01Q 15/0026; H01Q 15/0053; H01Q 15/006; H01Q 15/0086; H01Q 19/108; H01Q 21/26; H01Q 21/28; H01Q 25/00; H01Q 25/001; H01Q 25/002
See application file for complete search history.

(56) References Cited

U.S. PATENT DOCUMENTS

2021/0359414 A1 11/2021 Sundararajan et al.
2022/0320716 A1* 10/2022 Zhang ................ H01Q 15/0013

OTHER PUBLICATIONS

Soric, JC, A. Monti, A. Toscano, F. Bilotti, and A. Alù, “Dual-polarized reduction of dipole antenna blockage using mantle cloaks,” IEEE Trans. Antennas Propag., vol. 63, No. 11, pp. 4827-4834, Sep. 3, 2015. doi: 10.1109/TAP.2015.2476468.
He D, Q. Yu, Y. Chen, and S. Yang, “Dual-band shared-aperture base station antenna array with electromagnetic transparent antenna elements,” IEEE Trans. Antennas Propag., vol. 69, No. 9, pp. 5596-5606, Mar. 1, 2021. doi:10.1109/TAP.2021.3061151.

* cited by examiner

ANTENNA HAVING A SPATIAL BANDPASS STRUCTURE AND PARASITIC RADIATOR

RELATED APPLICATIONS

This application is a non-provisional application claiming the benefit of U.S. Provisional Patent Application No. 63/378,650, filed on Oct. 6, 2022.

TECHNICAL FIELD

The present invention relates to antennas. More specifically, the present invention relates to low-band, mid-band, and C-band antennas for use in multiband antenna arrays.

BACKGROUND

The cellular communication system is comprised of hexagonal cells, wherein each cell has a triangular antenna tower. The antenna tower in each cell consists of three sectors, with each sector corresponding to 120 degree coverage, and is divided into one or more base station antennas to facilitate frequency re-use and increase the channel capacity of wireless systems. Such base station antennas are thus an indispensable part of modern wireless communication systems.

To fulfill fast-growing user requirements, multi-port antennas operating at different frequency bands are typically deployed. This brings advantages such as cost reduction and reduction of the impact of wind load on the towers. To implement MIMO (multiple input, multiple output) technology, it is common to interleave columns of low-band (LB), mid-band (MB) and C-band antennas with dual-polarized slant polarization into a single, narrow-width reflector. As one example, two columns of LB arrays working over the frequency range of 617-960 MHz along with two columns of mid-band arrays operating in the frequency band of 1.695-2.69 GHz or/with C-band array of 3.3-4.2 GHz could be accommodated into the reflector with a width of less than 500 mm.

The deployment of such MIMO antenna arrays is commonly done to increase channel capacity and enhance the signal-to-noise ratio, enabling a high data transmission rate. However, embedding multiple columns of antenna arrays working at different frequency bands in a single, narrow-width reflector degrades the overall antenna's performance in terms of performance qualities such as beam-squint, blockage, and gain.

In fact, in commonly used interleaved base station antenna arrays, mid-band and low-band antennas are typically placed physically close to each other. However, incident electromagnetic waves in the mid-band frequencies are often scattered by the nearby low-band radiators. This scattered signal is thus erroneously added to the incident far-field of the low-band antennas, resulting in beam-squint, interference, and distorted beam in the azimuth and elevation planes.

To suppress such cross-band scattering, different techniques, such as chokes and metasurface shields, have been introduced (see references [1] to [3], described below). In [1], for example, the authors modified a low-band radiator into different sections by embedding chokes between each section, so as to suppress the induced higher band's current and thereby reduce the scattered signal. However, such an approach constrains the shapes that may be used for the antenna and the potential performance of that antenna. As well, the proposed choke technique is only capable of reducing the cross-band scattering in a specific band, and the proposed choke technique does not allow for chokes that reduce cross-band scattering at dual-frequency bands. Further, achieving wide-band impedance matching for the radiator is also difficult using a choke-based approach.

Another approach, used in [2], applies a mantle cloak: that is, the low-band radiator is covered in metasurface shielding to suppress the scattering. However, this structure is complex and comparatively inefficient. As well, the resulting cloaked low-band radiator only achieves impedance matching over a narrow bandwidth.

Another approach, described in [3], provides two radiators on a multi-layer substrate. One of the radiators is used for low-end frequencies while the other is used for high-end frequencies. A segmented choke design is applied to the radiator for the low-end frequencies, which thus acts as a low-pass filter LC circuit. However, this design has a comparatively high cost of production. Additionally, as the higher end radiator is not segmented, but rather is a metal parasitic radiator, the high-band array performance may be degraded by such a radiator.

Clearly, there is a need for systems and methods that remedy the deficiencies of the prior art.

SUMMARY

This document discloses an antenna comprising a plurality of spatial bandpass structures, wherein each spatial bandpass structure comprises an LC resonator having at least one parasitic patch disposed within a loop of the resonator. The plurality of spatial bandpass structures is positioned around a central section of the antenna. In some embodiments, each spatial bandpass structure is embedded in a radiating arm of an antenna. In some embodiments, the central section comprises at least one radiator. In some embodiments, the antenna further comprises at least one parasitic radiator disposed between two spatial bandpass structures. In other embodiments, the antenna has only one spatial bandpass structure, and/or is configured unevenly (i.e., such that different sides of the antenna are configured differently). The person skilled in the art would be able to select suitable antenna designs for desired implementations.

In a first aspect, this document discloses an antenna comprising: a central section; and a plurality of spatial band pass structures surrounding said central section, wherein each of said plurality of spatial band pass structures comprises at least one parasitic patch.

In another embodiment, this document discloses an antenna wherein each of said plurality of spatial band pass structures comprises an LC resonator.

In another embodiment, this document discloses an antenna wherein each of said plurality of spatial band pass structures further comprises at least one loop and wherein each at least one parasitic patch is disposed within a corresponding one of said at least one loop.

In another embodiment, this document discloses an antenna wherein the spatial bandpass structures are embedded into radiating arms of said antenna.

In another embodiment, this document discloses an antenna wherein the central section comprises at least one radiator.

In another embodiment, this document discloses an antenna further comprising at least one parasitic radiator positioned between two of said plurality of spatial band pass structures.

In another embodiment, this document discloses an antenna wherein at least two of said plurality of spatial band pass structures are of different designs.

In another embodiment, this document discloses an antenna wherein said at least one parasitic patch has a shape that is at least one of: square, rectangular, polygonal, circular, lobular, and annular.

In another embodiment, this document discloses an antenna wherein said at least one parasitic patch is at least one of: multilayer and single-layer.

In another embodiment, this document discloses an antenna wherein said at least one loop has a shape that is at least one of: rectangular, square, polygonal, and arced.

In another embodiment, this document discloses an antenna wherein said antenna is a low-band antenna.

In another embodiment, this document discloses an antenna wherein said antenna is a mid-band antenna.

In a second aspect, this document discloses a multiband base station antenna array comprising: a plurality of low-band antennas; a plurality of mid-band antennas; and a plurality of C-band antennas, wherein at least one of the following conditions is true: at least some of said plurality of low-band antennas comprise low-band spatial band pass structures; and at least some of said plurality of mid-band antennas comprise mid-band spatial band pass structures, wherein said low-band spatial band pass structures and said mid-band spatial band pass structures each comprise at least one parasitic patch.

In another embodiment, this document discloses a multiband base station antenna array wherein said at least one parasitic patch has a shape that is at least one of: square, rectangular, polygonal, circular, lobular, and annular.

In another embodiment, this document discloses a multiband base station antenna array wherein each said at least one parasitic patch is disposed within a specific loop of a corresponding one of said spatial band pass structures.

In another embodiment, this document discloses a multiband base station antenna array wherein at least some of said plurality of low-band antennas comprise at least one parasitic radiator positioned between two of said spatial band pass structures.

In another embodiment, this document discloses a multiband base station antenna array wherein at least some of said plurality of mid-band antennas comprise at least one parasitic radiator positioned between two of said spatial band pass structures.

In a third aspect, this document discloses a spatial band pass structure for an antenna, said spatial band pass structure comprising: at least one loop disposed near an edge of said spatial band pass structure; and at least one parasitic patch disposed within said at least one loop.

In another embodiment, this document discloses a spatial bandpass structure wherein said at least one loop has a shape that is at least one of: rectangular, square, polygonal, and arced.

In another embodiment, this document discloses a spatial bandpass structure wherein said at least one parasitic patch has a shape that is at least one of: square, rectangular, polygonal, circular, lobular, and annular.

In another embodiment, this document discloses a spatial bandpass structure wherein said at least one parasitic patch is at least one of: multilayer and single-layer.

In another embodiment, this document discloses a spatial bandpass structure wherein said spatial band pass structure comprises: a first loop; a second loop disposed adjacent said first loop; a first parasitic patch disposed within said first loop; and a second parasitic patch disposed within said second loop.

BRIEF DESCRIPTION OF THE DRAWINGS

The present invention will now be described by reference to the following figures, in which identical reference numerals refer to identical elements and in which.

DETAILED DESCRIPTION

To better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

This document discloses a spatial bandpass structure for an antenna. The spatial bandpass structure comprises an LC resonator having at least one parasitic patch. The parasitic patch is disposed within a loop of the LC resonator in the spatial bandpass structure. A plurality of spatial bandpass structures is disposed around a central section, thereby forming the antenna. In some embodiments, the antenna also comprises at least one parasitic radiator, such that each parasitic radiator is disposed between two of the spatial bandpass structures.

The spatial bandpass structure described herein provides single/dual band performance for higher frequencies with wideband characteristics, over the frequency bands of 1.695-2.69 GHz and/or 3.3-4.2 GHz. Antennas using spatial bandpass structures according to the disclosures herein, further, have wideband transmission response based on different incident angles. Additionally, in some embodiments, when low-band and/or mid-band antennas comprising such spatial bandpass structures are included in a multi-band antenna array as also described herein, the lower band antennas are rendered transparent to higher frequency bands. This improves the gain and isolation of the lower band antennas and the overall characteristics of beam squint, azimuth radiation pattern, and gain are also improved compared to multi-band antenna arrays that do not include antennas having such spatial bandpass structures. Further, the antennas disclosed herein provide impedance matching over the entire wideband operating frequency.

In some embodiments, the arms of the antenna, into which the spatial bandpass structures are embedded, comprise radiators. In other embodiments, the central section of the antenna comprises at least one radiator. In some embodiments, the antenna comprises multiple radiators, e.g., a pair of dipole radiators. Further, as should be understood, the antenna may comprise any suitable number of loops/resonators/etc., disposed in any suitable configuration for a desired implementation.

Multiple specific designs of spatial bandpass structure are possible depending on the implementation. In particular, the antenna may be a low-band antenna or a mid-band antenna. Different designs, as will be discussed further below, would be applied for low-band antennas as opposed to mid-band antennas. Additionally, in some implementations, the antenna comprises spatial bandpass structures of different designs. Additionally, as mentioned above, the antenna may be configured unevenly, such that different sides of the antenna comprise different elements.

Figure 1:
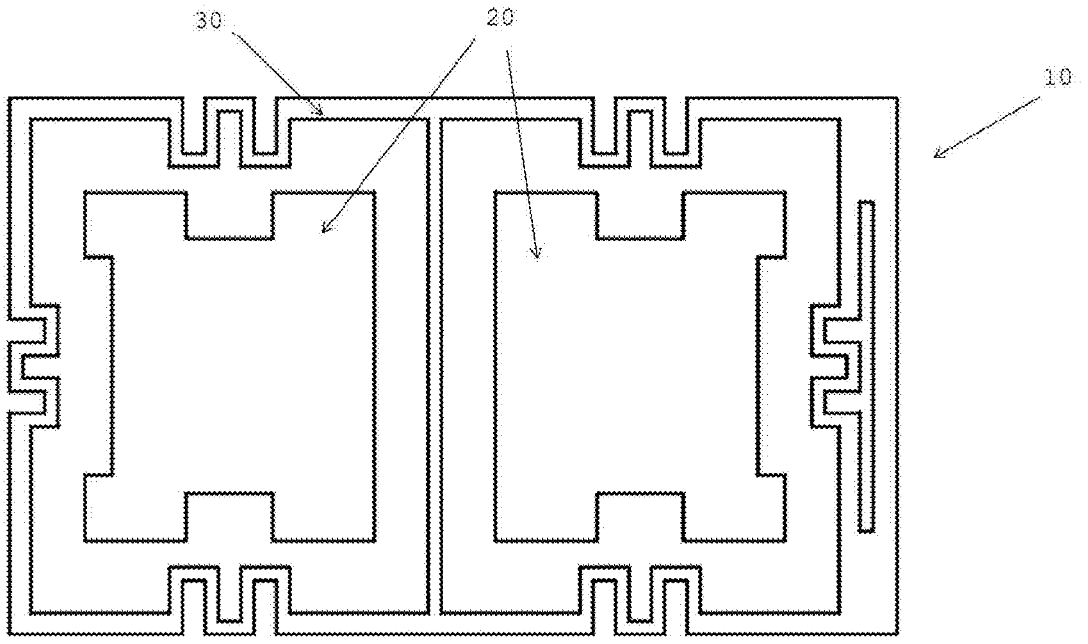
FIG. 1 is a schematic of a spatial bandpass structure according to an embodiment of the present invention.

An exemplary design of a spatial bandpass structure 10 is shown in FIG. 1. In this figure, parasitic patches 20 are disposed within the loops of the resonator 30. Each loop, which is generally rectangular in this implementation, acts as an inductor, and each parasitic patch has a capacitance effect (together creating an LC resonator circuit). In this embodiment, the generally rectangular loops 30 have polygonal meanders. The polygonal meanders increase the inductance of the loops 30 and thereby widen the bandwidth.

Figure 2:
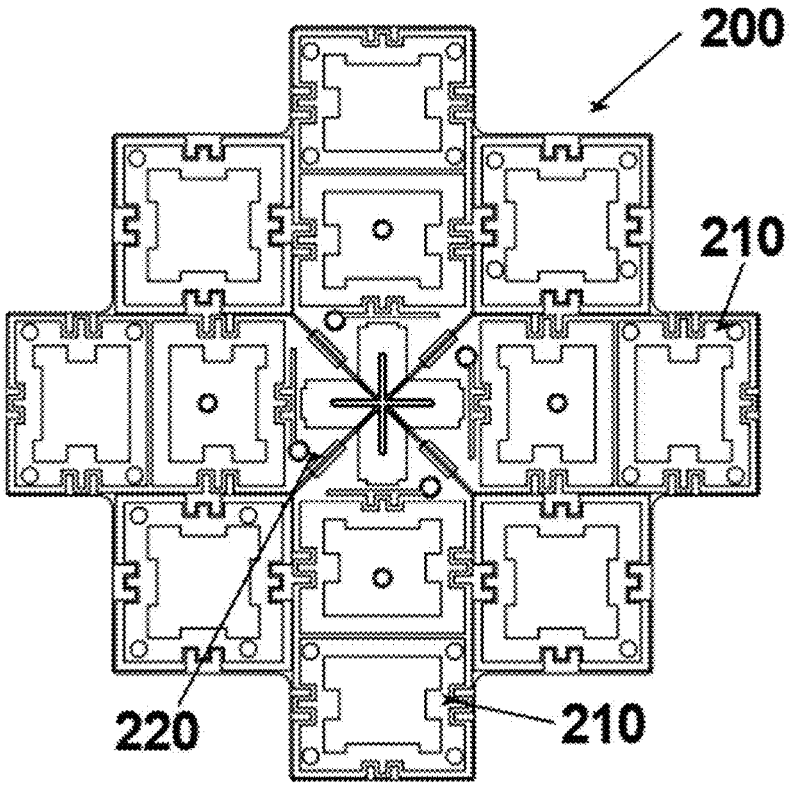
FIG. 2 is a schematic of a low-band antenna according to an embodiment of the present invention.

FIG. 2 shows a low-band antenna 200 according to an embodiment of the invention, comprising a plurality of spatial bandpass structures 210. The spatial bandpass structures are arranged around a central section 220 of the antenna 200. Each segment of each spatial bandpass structure acts as a parallel spatial bandpass LC circuit for both the vertical and the horizontal polarization of the antenna.

Figure 3:
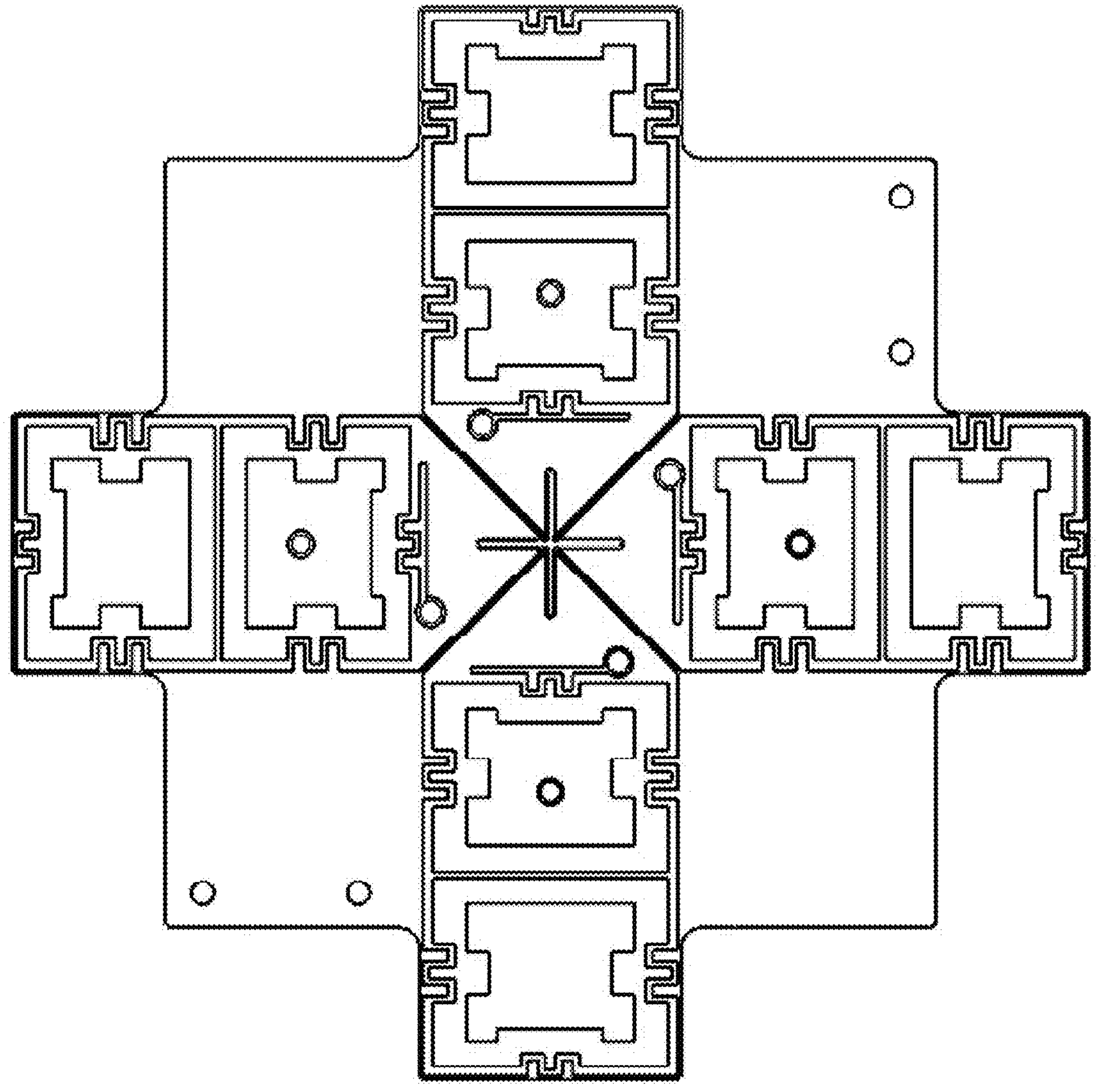
FIG. 3 is a schematic of a low-band antenna according to another embodiment of the present invention.
Figure 4:
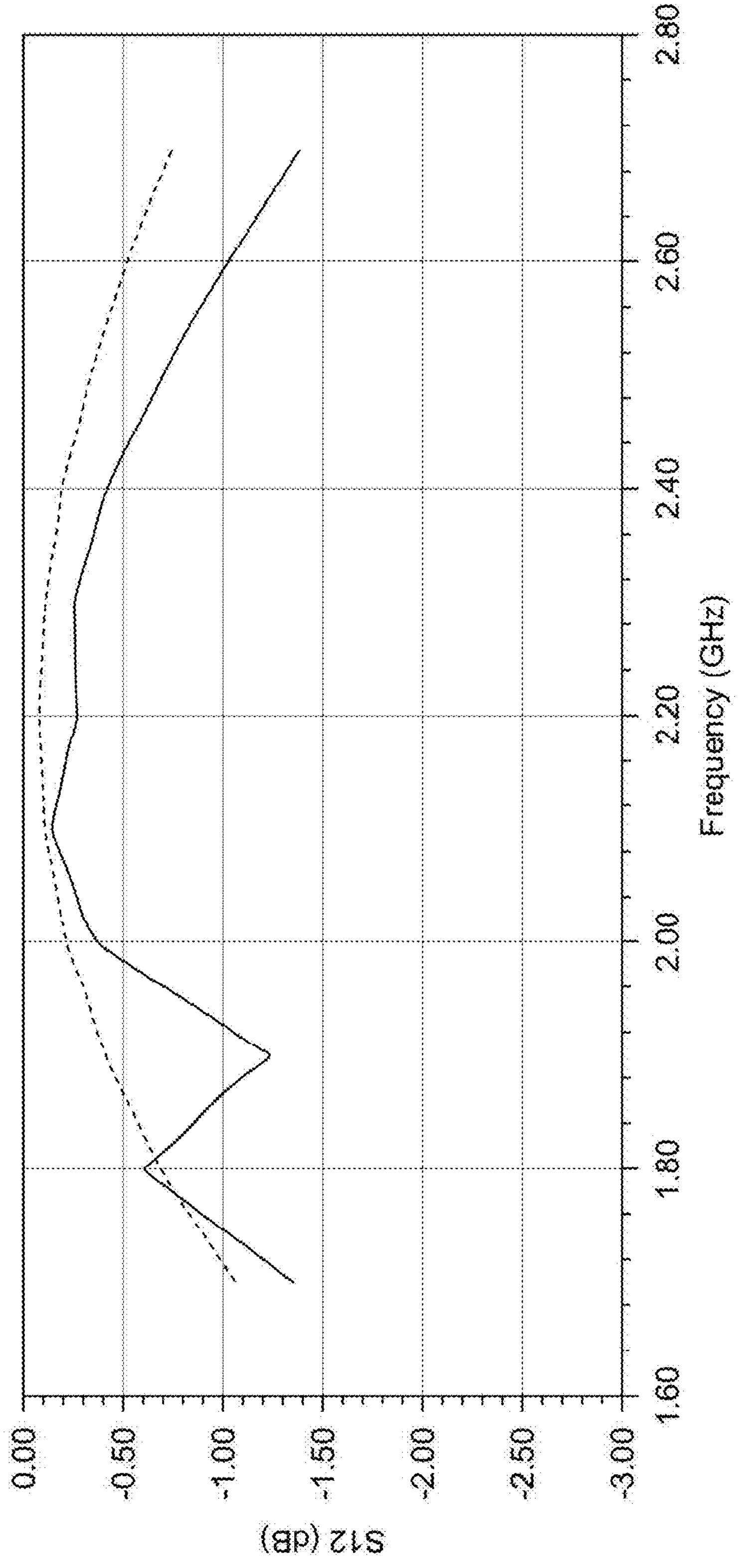
FIG. 4 is a plot of the transmission coefficient S12 for an antenna using spatial bandpass structures.

For testing purposes, a boundary condition was applied to an antenna similar to that depicted in FIG. 2, but lacking parasitic radiators. Such an antenna is schematically shown in FIG. 3. In the tests, the transmission response of the antenna with such a boundary condition applied was evaluated. The transmission coefficient (S12, a parameter representing the power transferred between two ports of an antenna network) for both polarizations is plotted in FIG. 4. As is well-known, the transmission coefficient(s) of antennas can be analyzed to tune unit cells, such that they allow or reject certain frequency bands. In the example shown, the unit cell is designed to be used in the 698-896 MHz band and to also pass (allow) signals in the 1.695-2.69 GHz band. As can be observed, the magnitude of S12 for both polarizations when parasitic radiators are not used is below 1.4 dB over the frequency range of 1.695-2.69 GHz.

Figure 5A:
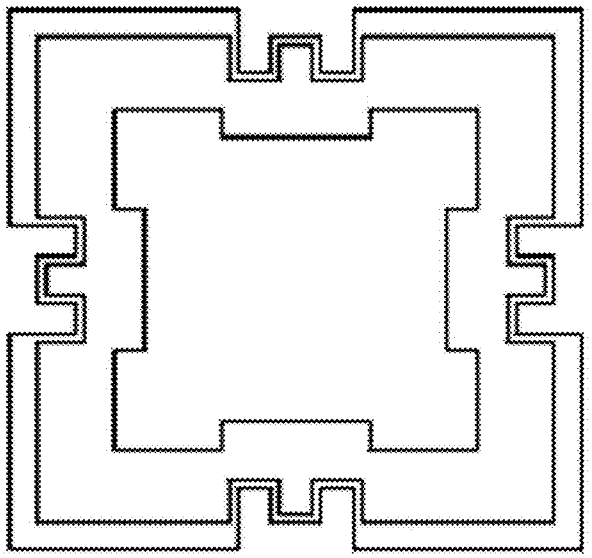
FIG. 5A is a schematic of a parasitic radiator according to one embodiment of the present invention.
Figure 5B:
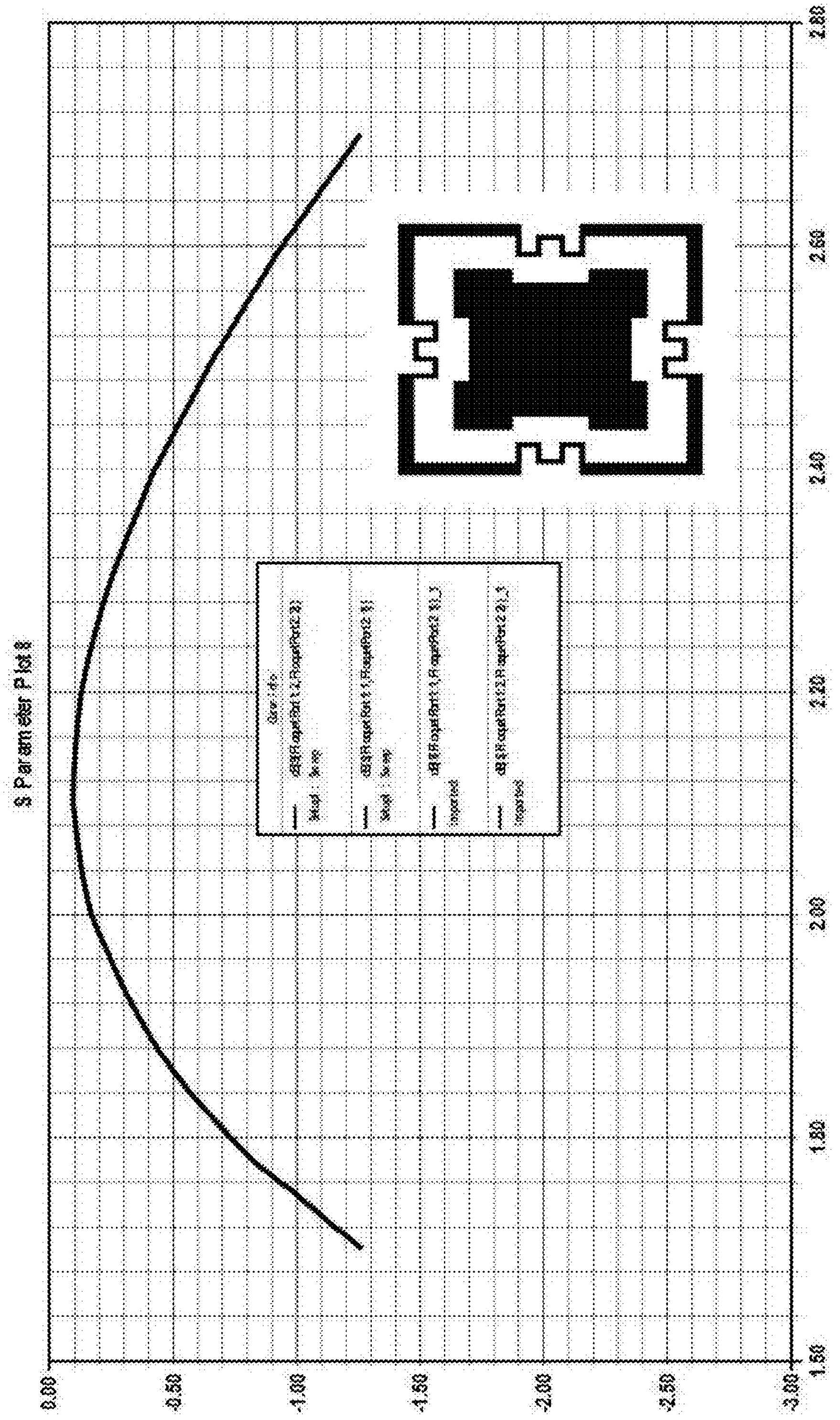
FIG. 5B is a plot of the transmission coefficient S12 for an antenna using spatial bandpass structures and parasitic radiators.

Further, to improve impedance matching of the low-band antenna in higher part of the frequency band, at least one parasitic radiator is added to the antenna in some embodiments. Each at least one parasitic radiator is disposed between two spatial bandpass structures (e.g., between two arms of the antenna). In some embodiments, such parasitic radiators comprise a solid square patch. However, square solid patch radiators can degrade the radiation pattern of nearby MB elements in a multi-band antenna array, in particular at the higher part of the mid-band. Thus, in preferred embodiments, the at least one parasitic radiator is a modified square loop with a parasitic patch, as shown in FIG. 5A. With such parasitic radiators in place (i.e., using the antenna of FIG. 2), and the boundary condition applied as used for the test plotted in FIG. 4, the transmission coefficient S12 was tested again. The results of such a test are shown in FIG. 5B. It can be observed from FIG. 5B that the magnitude of S12 was less than 1.3 dB in the frequency range of 1.695-2.69 GHz.

Of course, all of the above testing details are dependent on the specific implementation of the antenna and should not be taken as limiting the invention herein in any way. In particular, the above-described tests were performed on an exemplary low-band antenna but do not preclude low-band antennas with spatial bandpass structures from having better performance metrics than that described herein (e.g., due to specific design of the LC circuit, materials, positioning within an multi-band antenna array, etc.). This disclaimer applies to all tests and performance metrics disclosed herein.

Figure 6A:
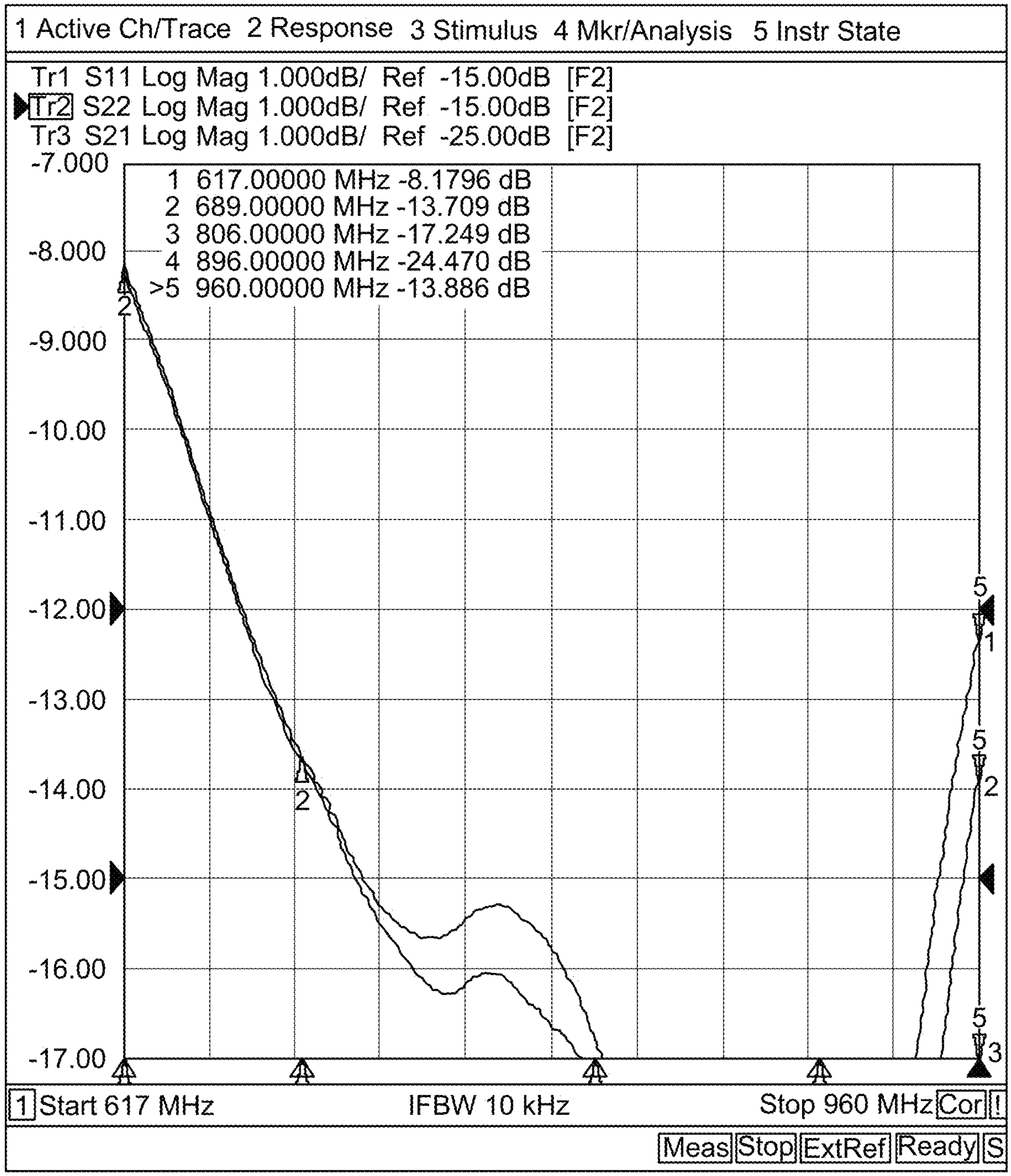
FIG. 6A is a plot of the parameter S11 for an antenna using spatial bandpass structures and parasitic radiators.
Figure 6B:
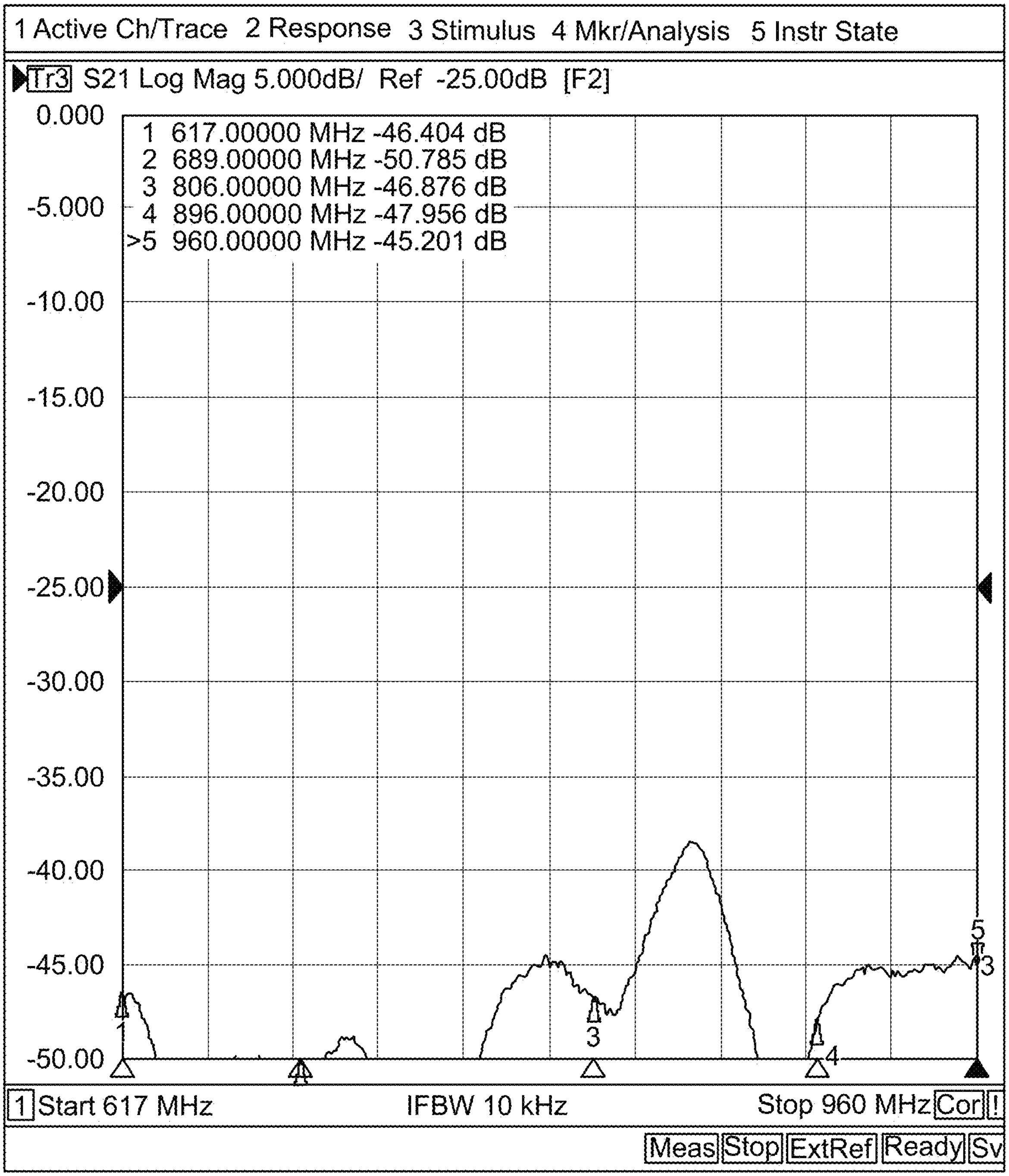
FIG. 6B is a plot of the parameter S21 for an antenna using spatial bandpass structures and parasitic radiators.
Figure 7A:
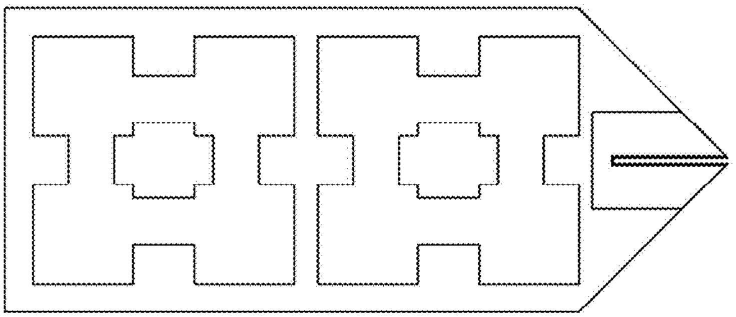
FIGS. 7A to 7F are schematics of spatial bandpass structure designs according to other embodiments of the present invention.
Figure 7B:
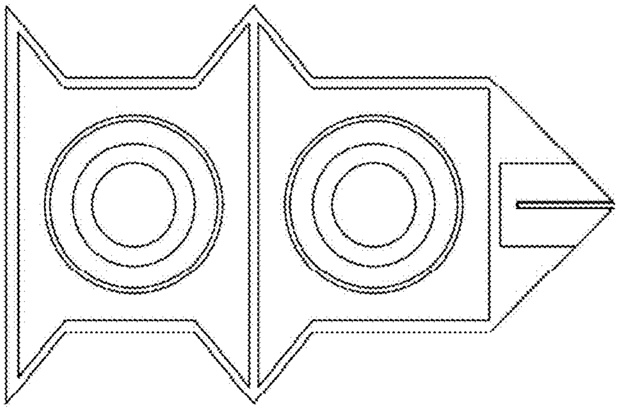
Figure 7C:
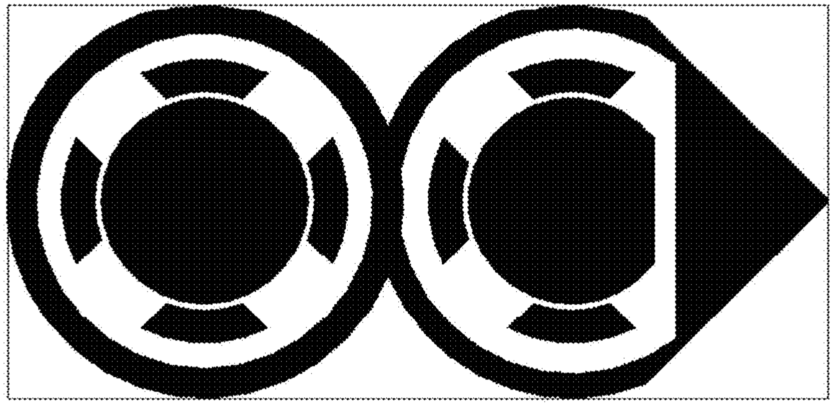
Figure 7D:
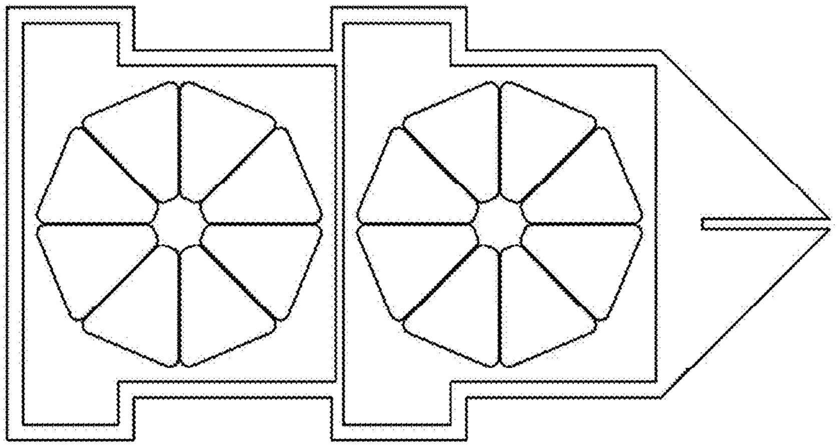
Figure 7E:
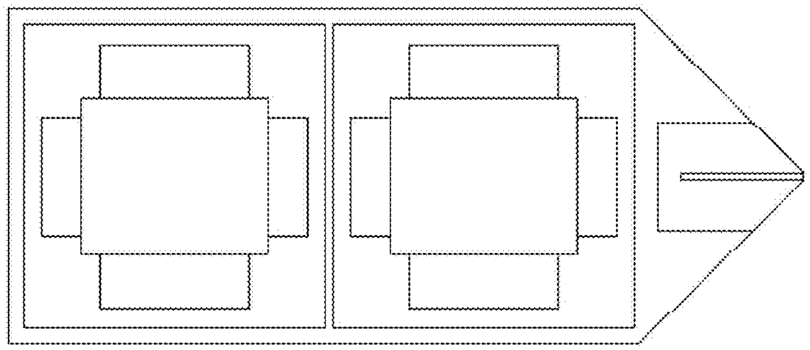
Figure 7F:
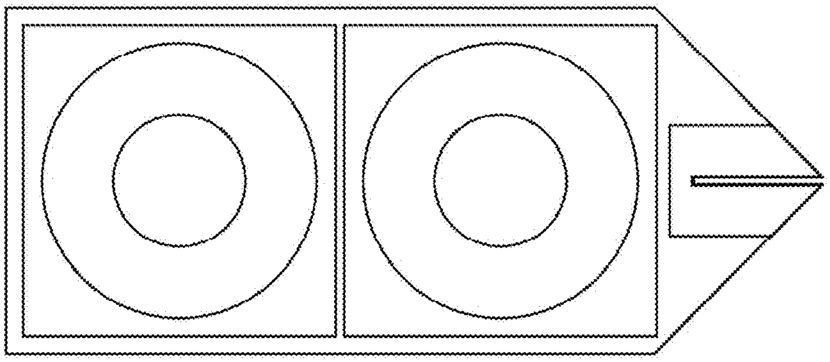

The measured results of a low-band dipole antenna with spatial bandpass structures embedded in the dipole arms and with parasitic radiators between each pair of arms are plotted in FIGS. 6A and 6B. As is shown in FIG. 6A, the magnitude of S11 (another well-known S-parameter/transmission coefficient of antennas) is less than 14 dB over the frequency band of 0.698-0.960 MHz. In addition, the measured isolation between plus and minus polarizations is less than −40 dB over the frequency band of 0.698-0.960 MHz, as shown in FIG. 6B.

As mentioned above, the spatial bandpass structure design shown in FIG. 1 is merely one possible example of a spatial bandpass structure design. Many other spatial bandpass structures using a parasitic patch in an LC resonator are possible. FIGS. 7A to 7F show further non-limiting examples of other possible spatial bandpass structure designs for use in low-band antennas. That said, it has been generally observed that antennas having a trace width less than 1.5 mm may have difficulties achieving wideband impedance matching. However, narrower trace widths result in improved spatial filter(s) and, accordingly, in improved transparency. As such, there is a trade-off between these two goals (i.e., between wideband impedance matching and transparency). It has been observed in tests that antennas having trace widths in the range of 1.5-2 mm generally provide a desirable balance of wideband impedance matching and transparency. However, of course, in some implementations, a different balance (and, correspondingly, a different trace width) may be preferred.

As well, it has been observed that a symmetrical structure on the LB radiator improves transparency for both +45 and −45 polarization in the mid-band. However, such a symmetrical structure on the LB radiator requires a larger surface area than an asymmetrical radiator. Thus, the LB radiator may physically overshadow the MB radiator when loaded in a multi-band array, which may not be desired. As such, there can thus be a trade-off between symmetry/transparency and performance.

Other designs would be apparent to the person skilled in the art and fall within the scope of the present invention. As well, as mentioned above, in some embodiments, a single antenna comprises spatial bandpass structures of different designs. As a non-limiting example, an antenna having four arms might have two arms loaded with spatial bandpass structures of a first design and two arms loaded with spatial bandpass structures of a second design. The person skilled in the art would be able to select spatial bandpass structure designs that are suitable for specific implementations.

Figure 8:
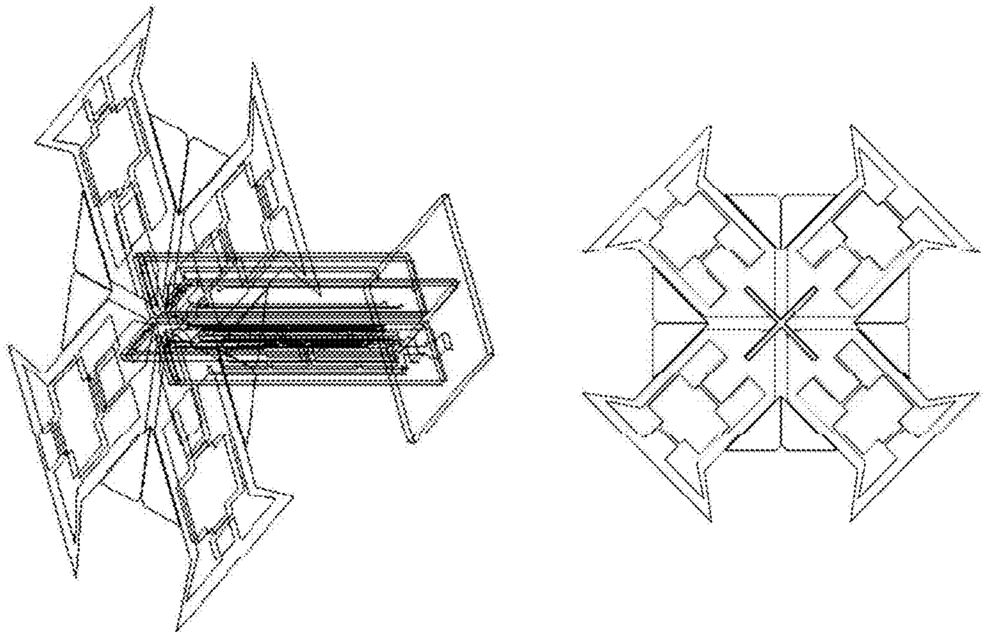
FIG. 8 is a schematic of a mid-band antenna according to an embodiment of the present invention.

Further, spatial bandpass structures are not limited to low-band antennas only. For example, FIG. 8 shows an spatial bandpass structure designed for use in a mid-band antenna. This structure acts as a band-pass filter for illuminated waves at the C-band frequency range—i.e., reducing the destructive scattering effect of MB antenna elements on nearby C-band elements in a multi-band antenna array.

A number of exemplary multi-band antenna arrays using the spatial bandpass structures according to the present disclosure are shown in FIGS. 9A, 9B, 10A, 10B, 11A, and 11B. (As would be understood by the person skilled in the art, each of these arrays is shown horizontally for visual convenience but would be positioned vertically when in use. As such, each row of antenna elements in the images may be equally referred to as a 'column'.)

Figure 9A:
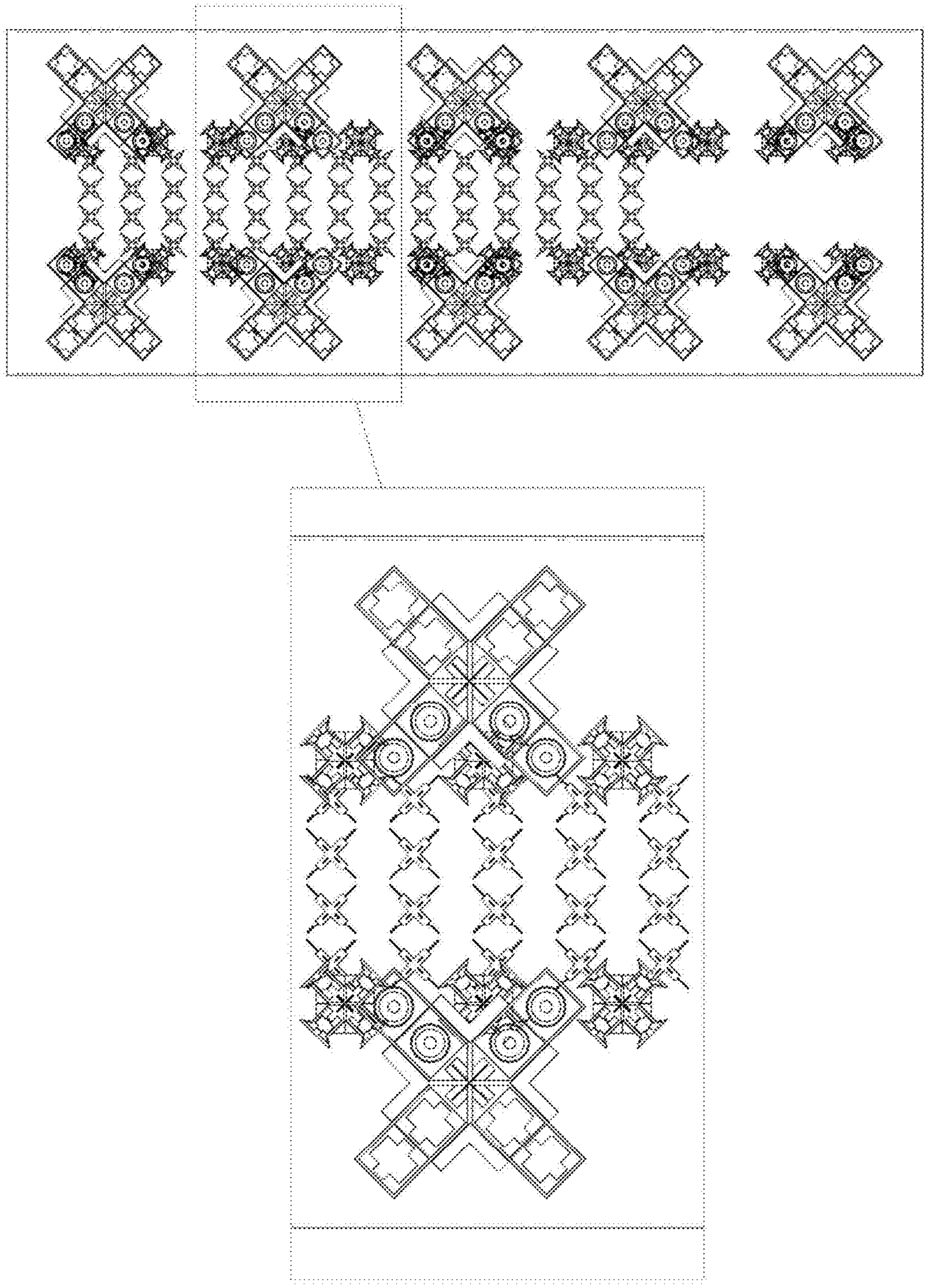
FIG. 9A is a schematic of a multi-band antenna array according to an embodiment of the present invention.
Figure 9B:
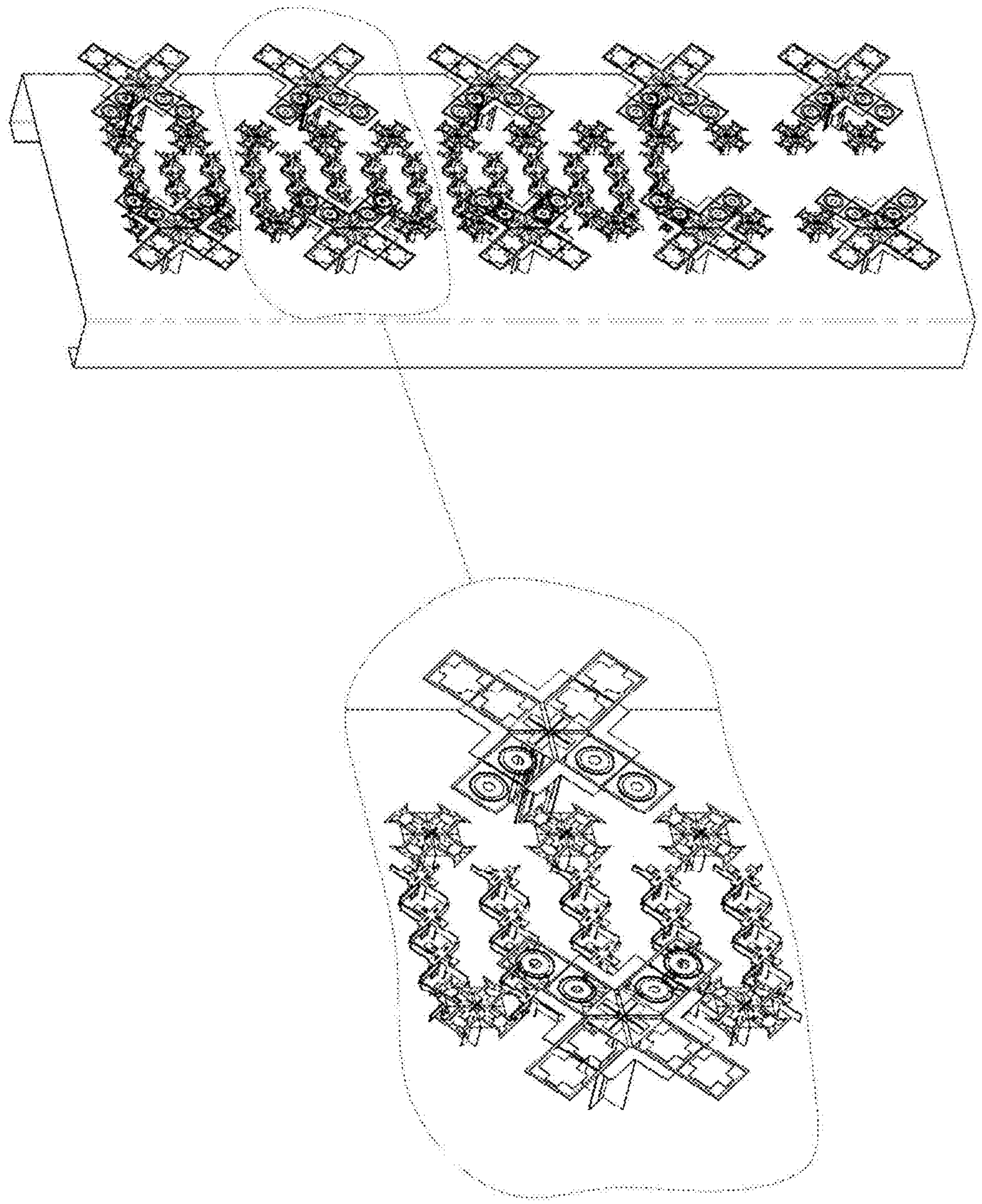
FIG. 9B is a perspective view of the multi-band antenna array of FIG. 9A.

FIG. 9A shows an exemplary multi-band antenna array having four columns of C-band antenna elements. The C-band antenna elements are flanked by columns of mid-band antennas, which are loaded with spatial bandpass structures as in FIG. 7. Additionally, columns of low-band antennas loaded with spatial bandpass structures flank the mid-band antennas; that is, in this implementation of a multi-band antenna array, the low-band antennas are nearest to the edges. Note that both mid-band antennas and low-band antennas, in this implementation, comprise spatial bandpass structures. As would be understood, depending on the implementation, spatial bandpass structures may be used only on low-band antennas, only on mid-band antennas, or both. (FIG. 9B shows the multi-band antenna array of FIG. 8A in a perspective view.) Further, in some embodiments, spatial bandpass structures are used on C-band antenna elements as well.

Figure 10A:
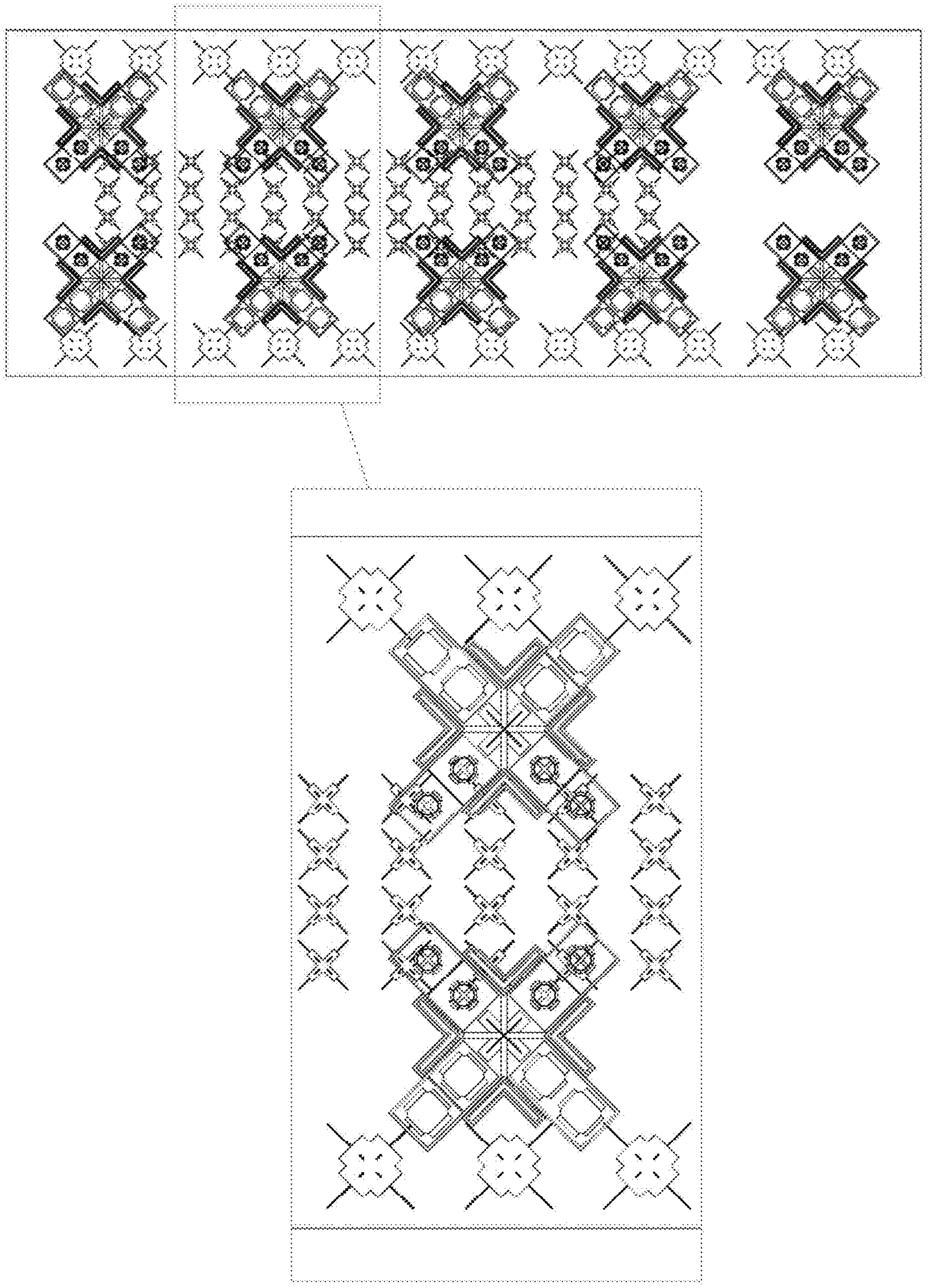
FIG. 10A is a schematic of another multi-band antenna array according to an embodiment of the present invention.
Figure 10B:
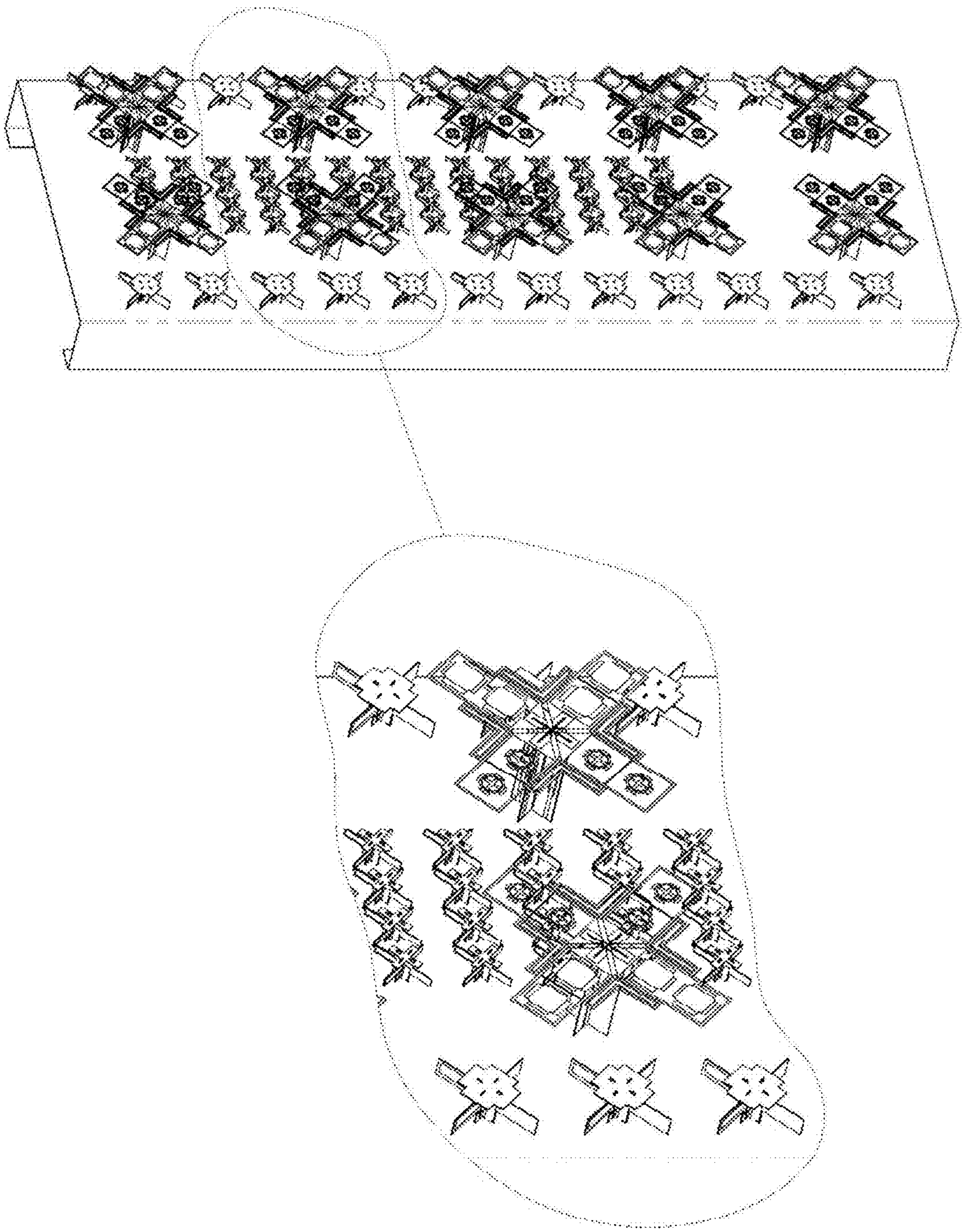
FIG. 10B is a perspective view of the multi-band antenna array of FIG. 10A.

Another exemplary multi-band antenna array is shown in FIGS. 10A and 10B. (Again, FIG. 10B is a perspective view of the multi-band antenna array in FIG. 10A.) In this implementation, the mid-band antennas are positioned closest to the edges of the reflector (i.e., the mid-band antennas are flanking the low-band antennas which are, themselves, flanking the columns of C-band antennas in the centre). Additionally, note that, in this implementation, the low-band antennas comprise spatial bandpass structures while the mid-band antennas do not have spatial bandpass structures. As well, in this implementation, two spatial bandpass structure designs were used. The spatial bandpass structures closer to the mid-band antennas use a design that renders them transparent in the MB, while the spatial bandpass structures closer to the C-band antennas use a design that renders them transparent in the C-band.

Figure 11A:
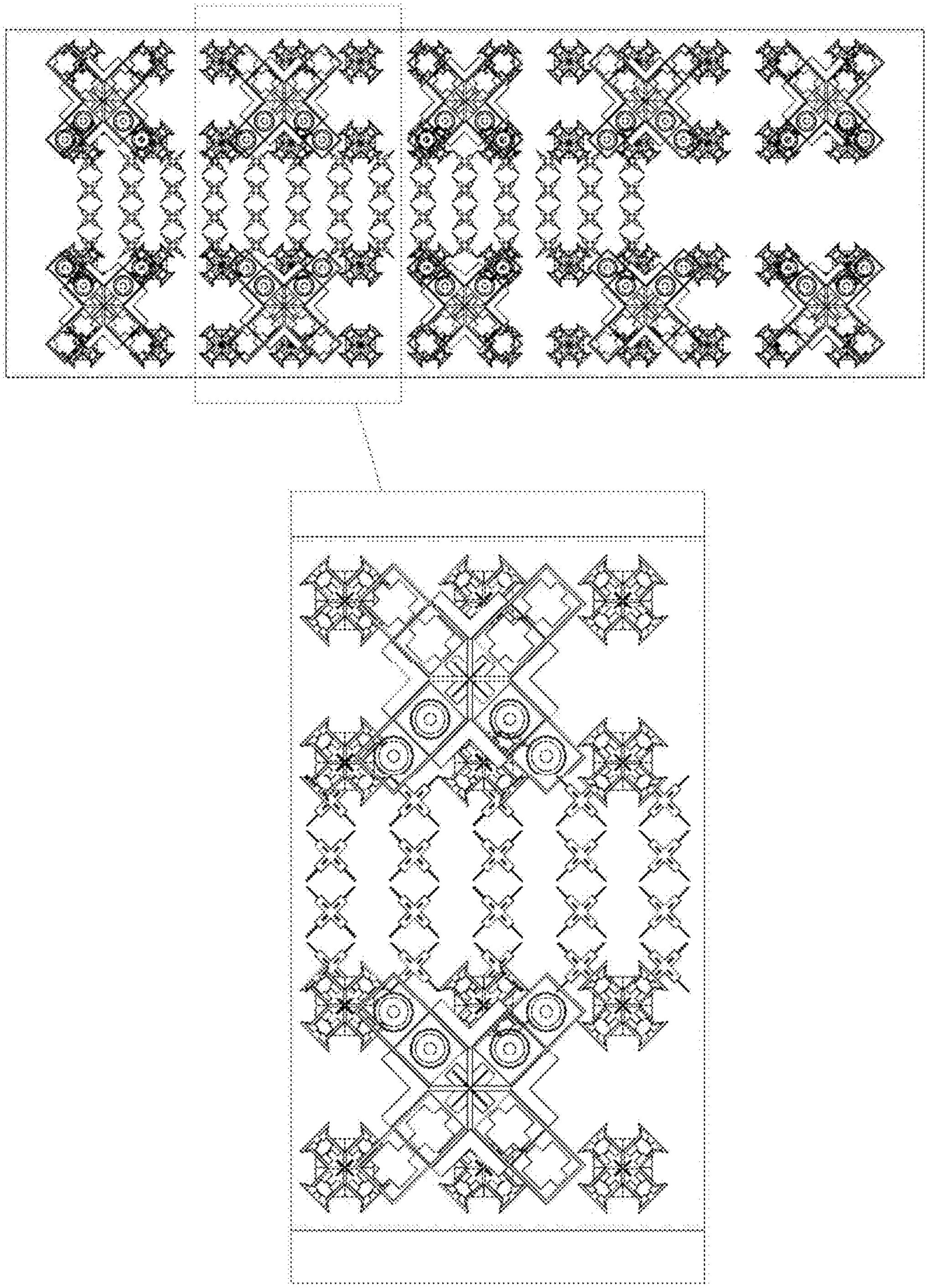
FIG. 11A is a schematic of another multi-band antenna array according to an embodiment of the present invention.
Figure 11B:
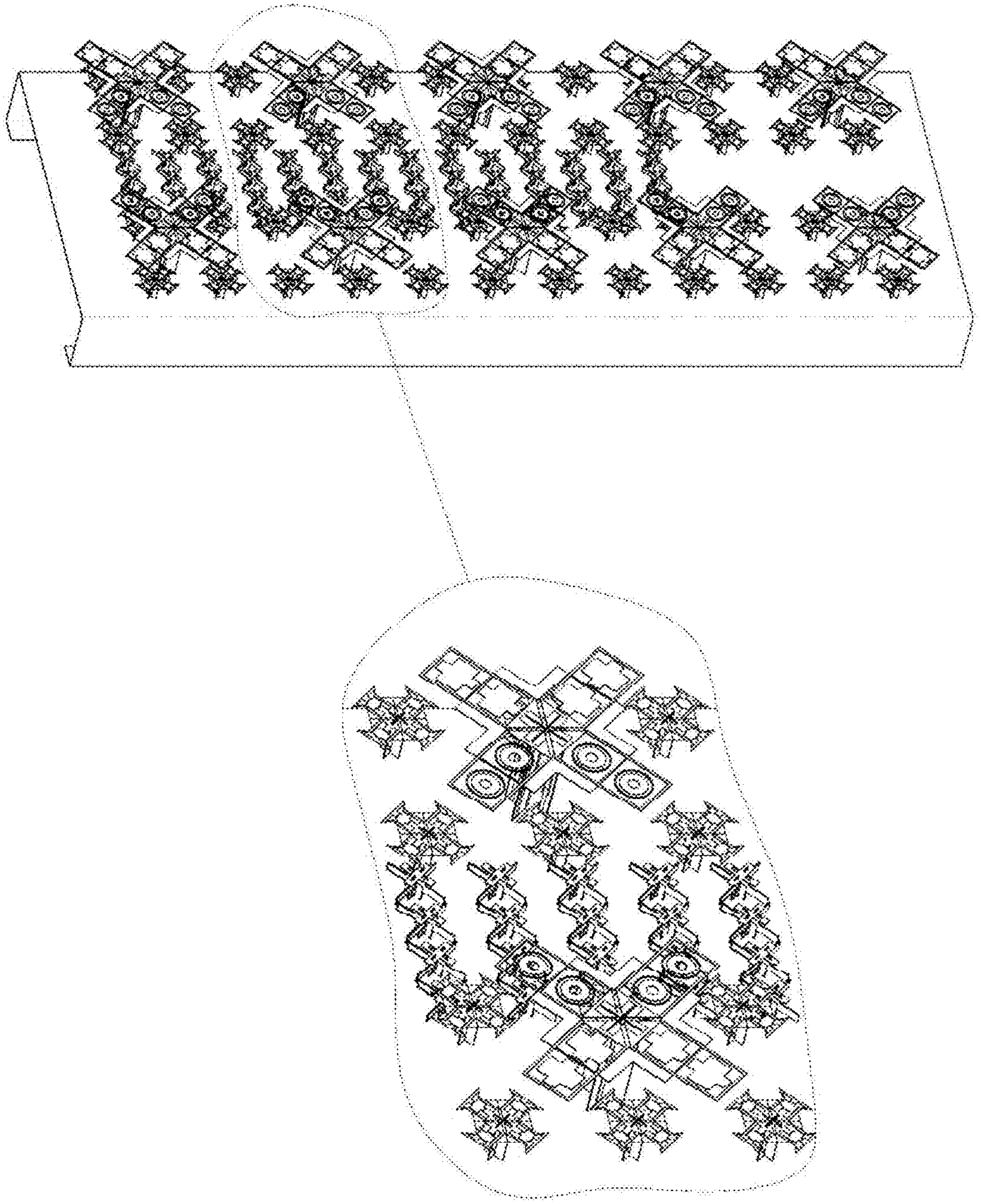
FIG. 11B is a perspective view of the multi-band antenna array of FIG. 11A.
Figure 11D:
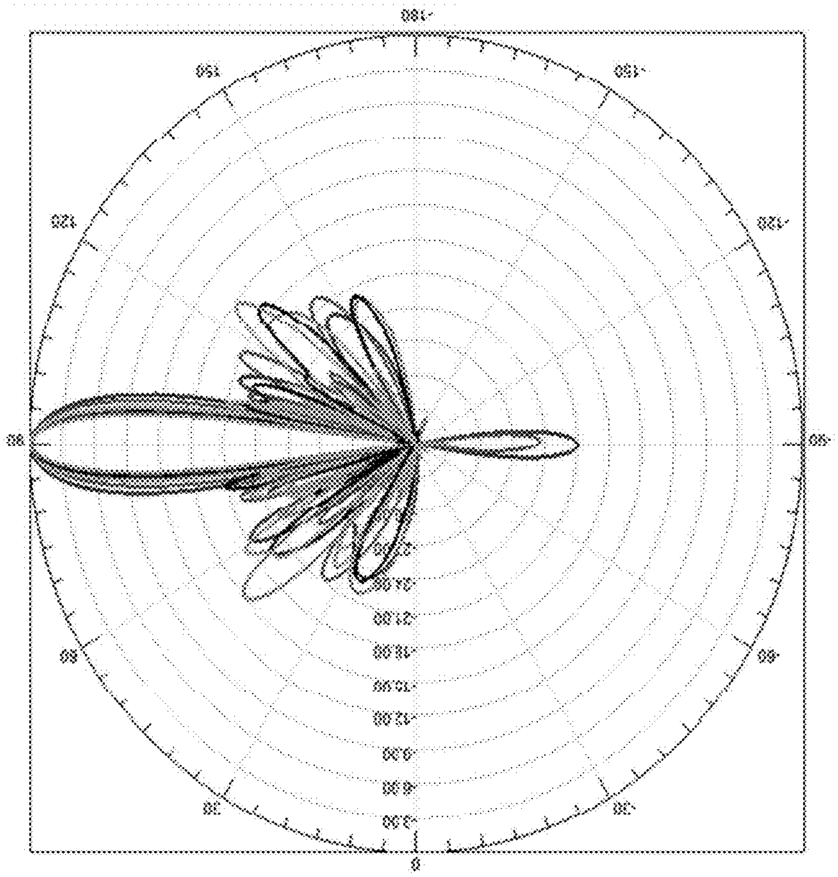
FIG. 11D shows the radiation pattern of MB antenna elements in the multi-band antenna array of FIG. 11A when the low-band antennas comprise spatial bandpass structures.
Figure 11C:
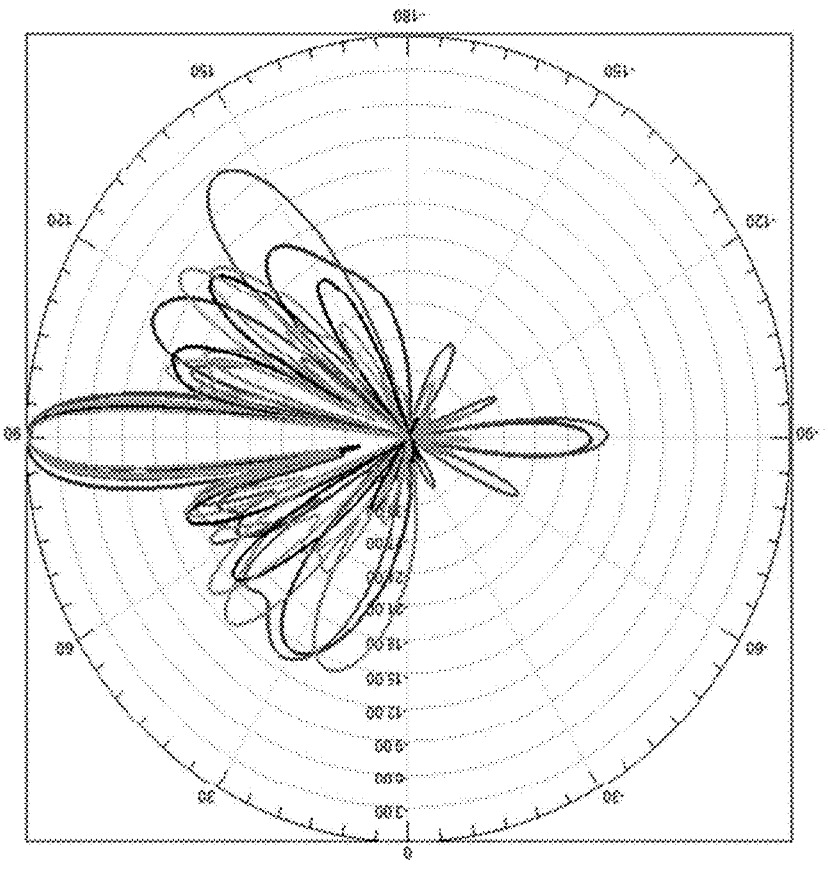
FIG. 11C shows the radiation pattern of MB antenna elements in the multi-band antenna array of FIG. 11A when the low-band antennas do not comprise spatial bandpass structures.

FIGS. 11A and 11B show a third exemplary multi-band antenna array, in which spatial bandpass structures are used on both the low-band antennas and the mid-band antennas. Additionally, in this implementation, mid-band antennas are positioned on both sides of the low-band antennas (i.e., mid-band antennas are closer to the reflector's edge and closer to the reflector's centre than the low-band antennas). The person skilled in the art would be able to select a suitable multi-band antenna array design for a specific use. FIGS. 11C and 11D, further, show the effect of using spatial bandpass structures on the low-band antennas in a multi-band antenna array arranged according to FIG. 11A. Specifically, FIG. 11C shows the radiation pattern of the MB antenna elements in the elevation plane when the low-band antennas do not comprise spatial bandpass structures. FIG. 11D, in contrast, shows the radiation pattern of the MB antenna elements in the elevation plane when the low-band antennas do comprise spatial bandpass structures. As can be seen, the side lobe level (SLL) is significantly improved in FIG. 11D, compared to FIG. 11C, indicating that the low-band antennas are effectively transparent for the MB when spatial bandpass structures are used.

Figure 12A:
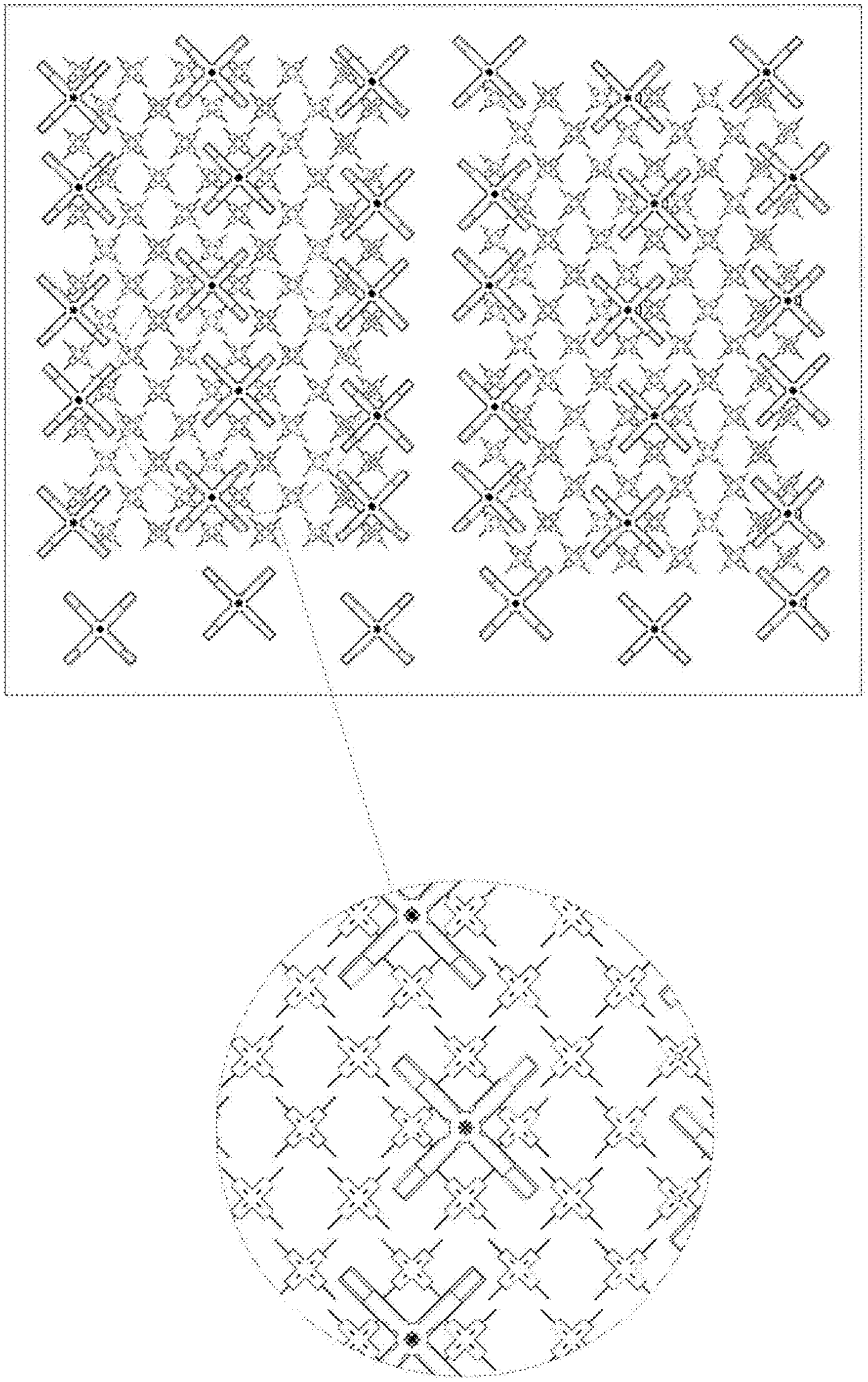
FIG. 12A (Prior Art)
FIG. 12A is a schematic of a conventional dual-band antenna array according to the prior art.
Figure 12B:
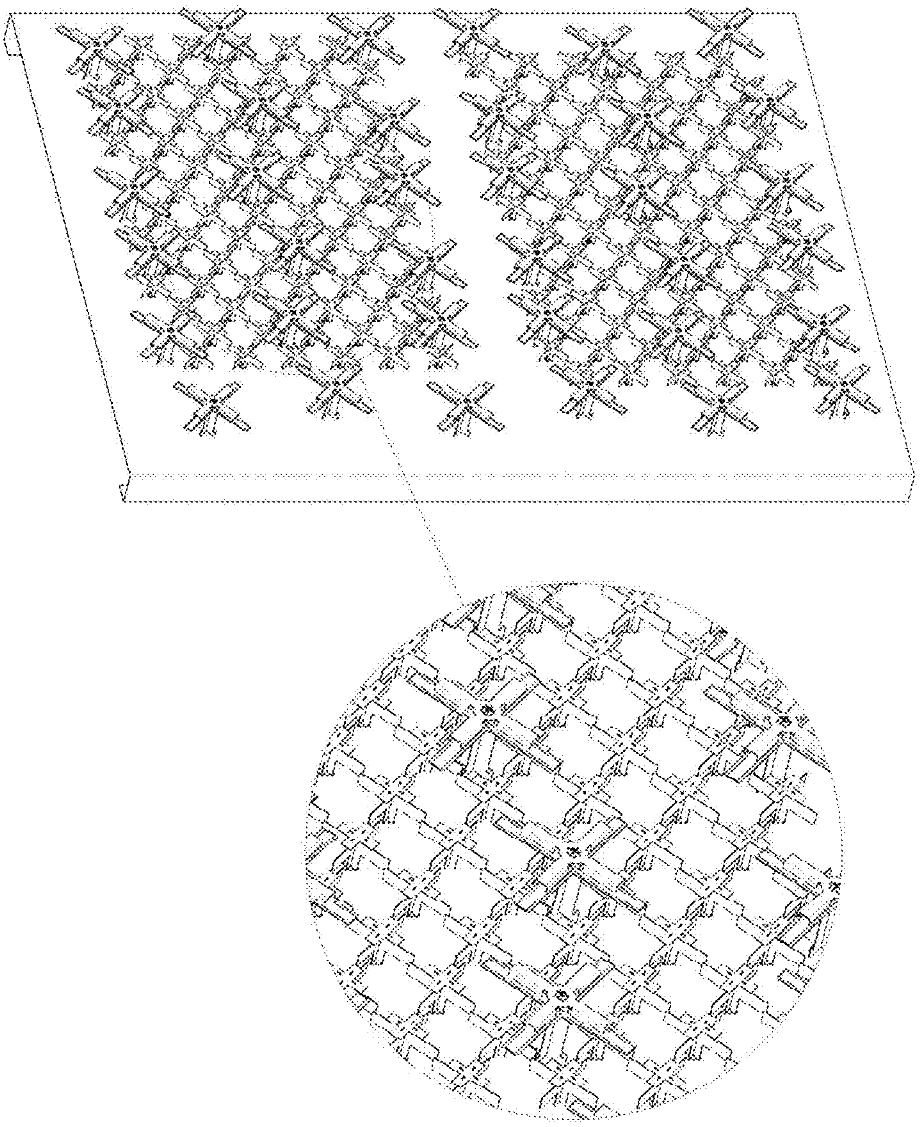
FIG. 12B (Prior Art)
FIG. 12B is a perspective view of the antenna array of FIG. 12A.

FIGS. 12A through 17 further show the effects of loading low-band antennas with spatial bandpass structures according to the disclosures herein. A conventional first dual-band antenna array (3-beam low-band and 6-beam mid-band), covering both 617-960 MHz and 1695-2690 MHz bands and using conventional dipole antennas is shown in FIGS. 12A and 12B. A modified dual-band antenna array according to an embodiment of the present invention is shown in FIGS. 13A and 13B. In the modified antenna array, low-band antennas having spatial bandpass structures were used instead of conventional low-band antennas.

Figure 13A:
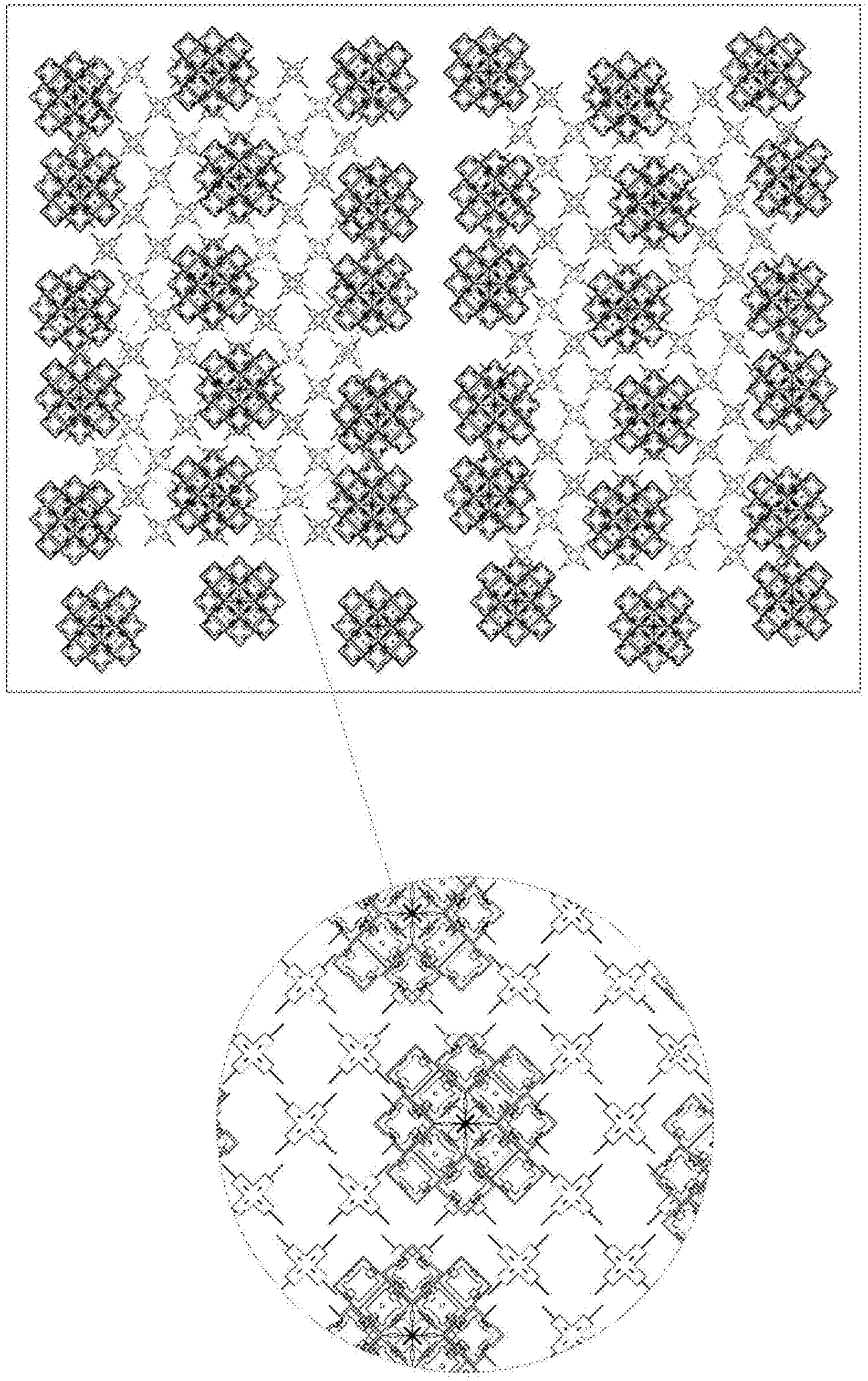
FIG. 13A is a schematic of a dual-band antenna array according to another embodiment of the invention.
Figure 13B:
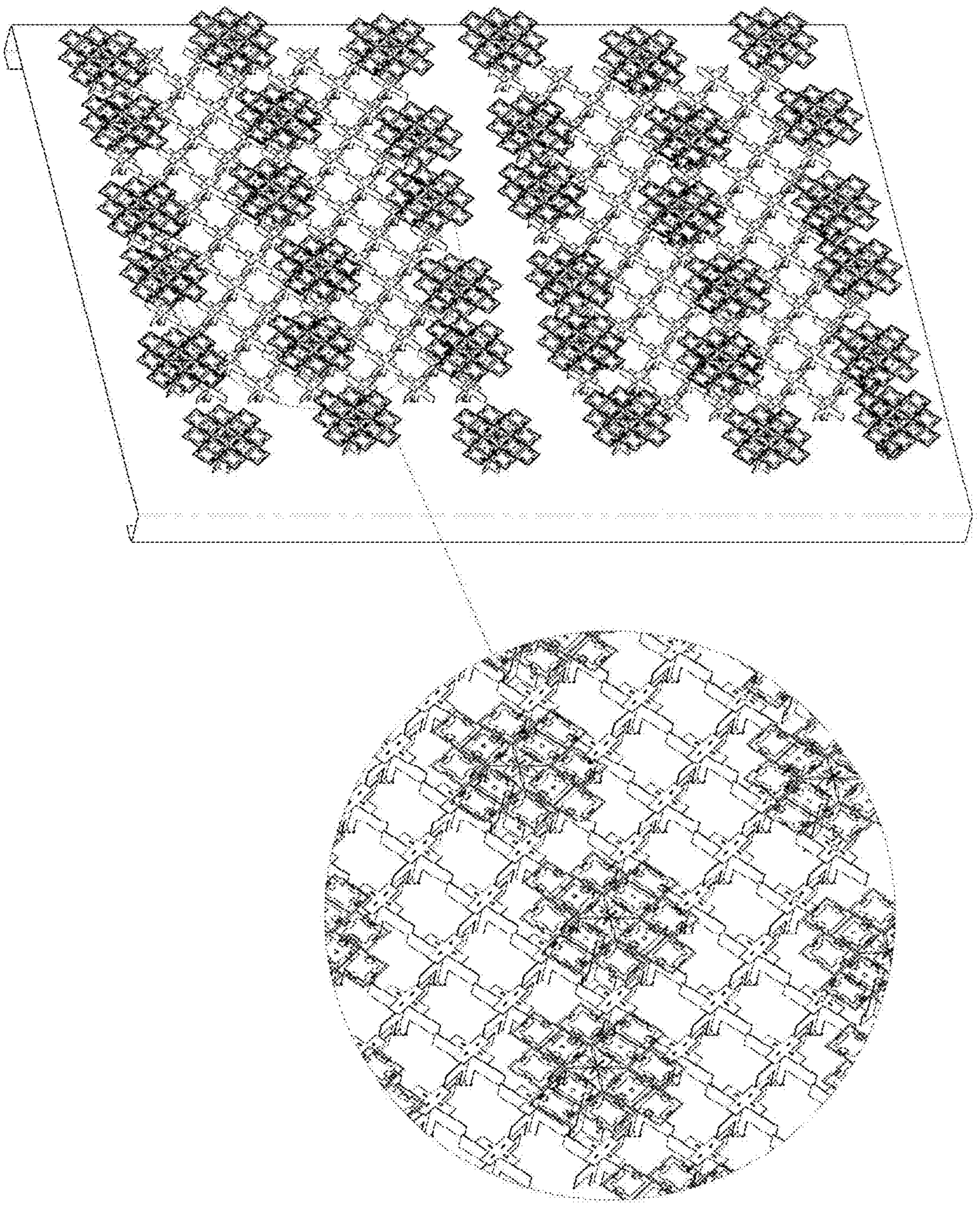
FIG. 13B is a perspective view of the antenna array of FIG. 13A.
Figure 14A:
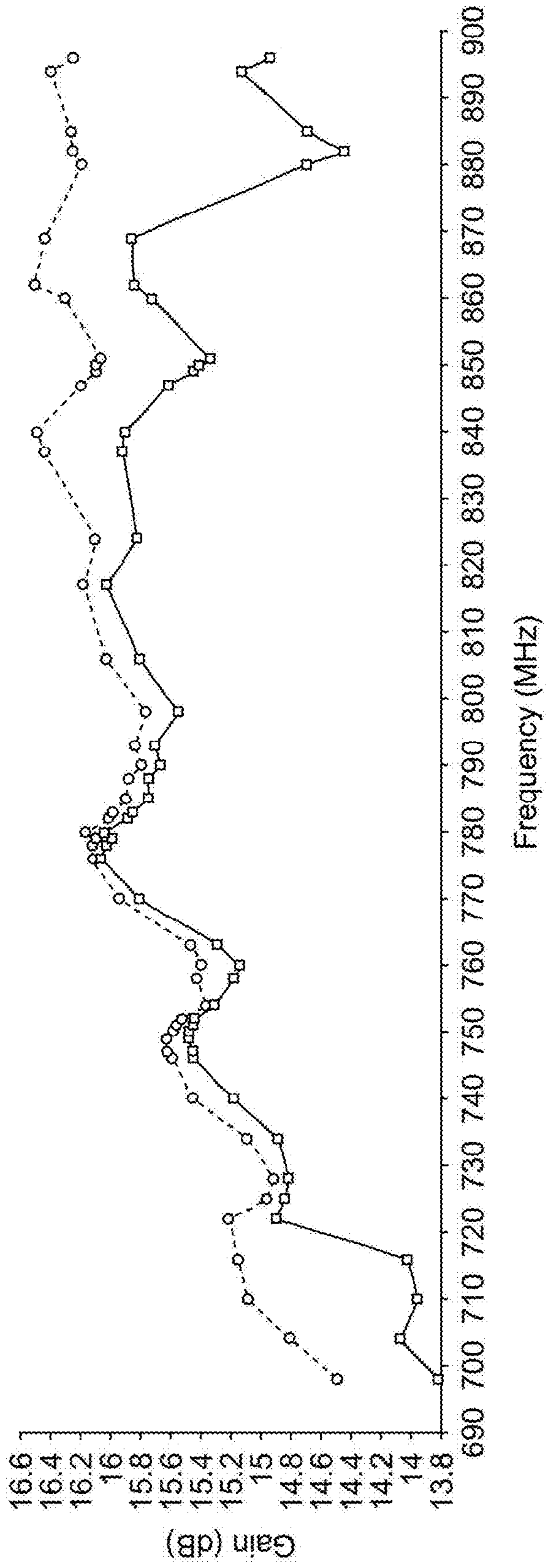
FIG. 14A is a plot of gain of the antenna array of FIG. 12A.
Figure 14B:
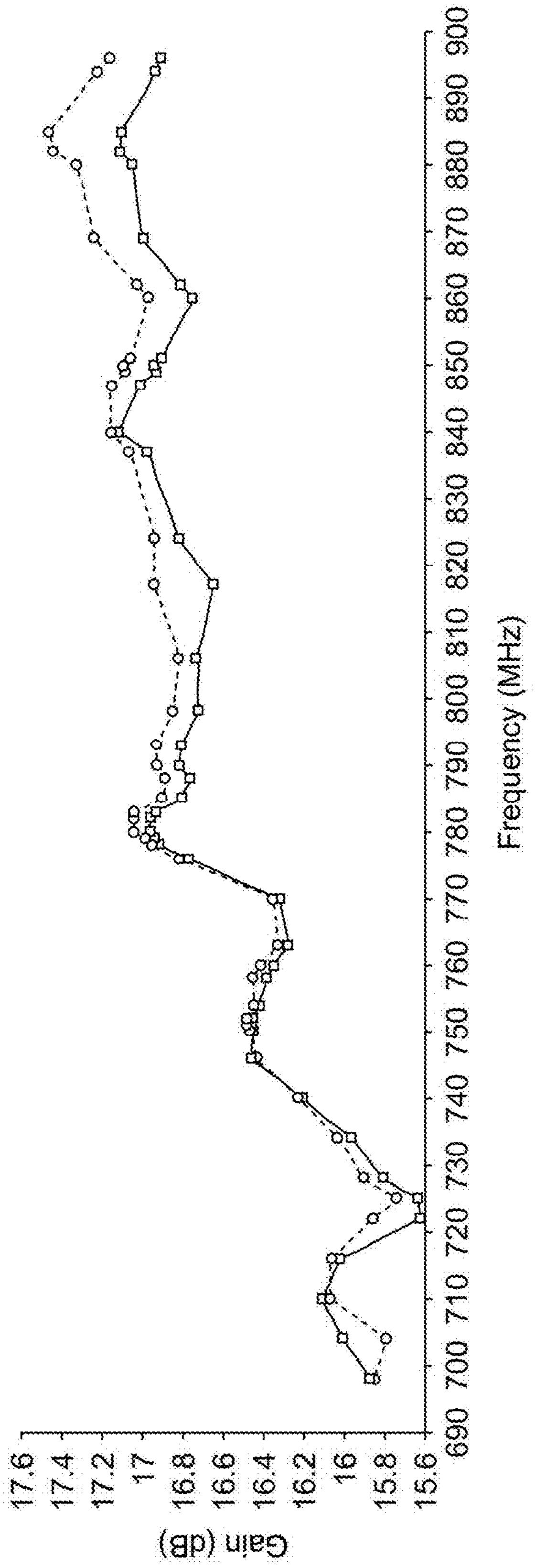
FIG. 14B is a plot of gain of the antenna array of FIG. 13A.

FIG. 14A shows the gain of the conventional dual-band antenna array of FIG. 12A, while FIG. 14B shows the gain of the modified dual-band antenna array of FIG. 13A. As is shown, the gain of the modified dual-band antenna array improves, compared to that of the conventional dual-band antenna array, by up to 1 dBi. Further, the gain drop of the conventional dual-band antenna array at the end of the low-band frequency is addressed by using spatial bandpass structures on the low-band radiators to thereby minimize inter-band interferences.

Figure 15A:
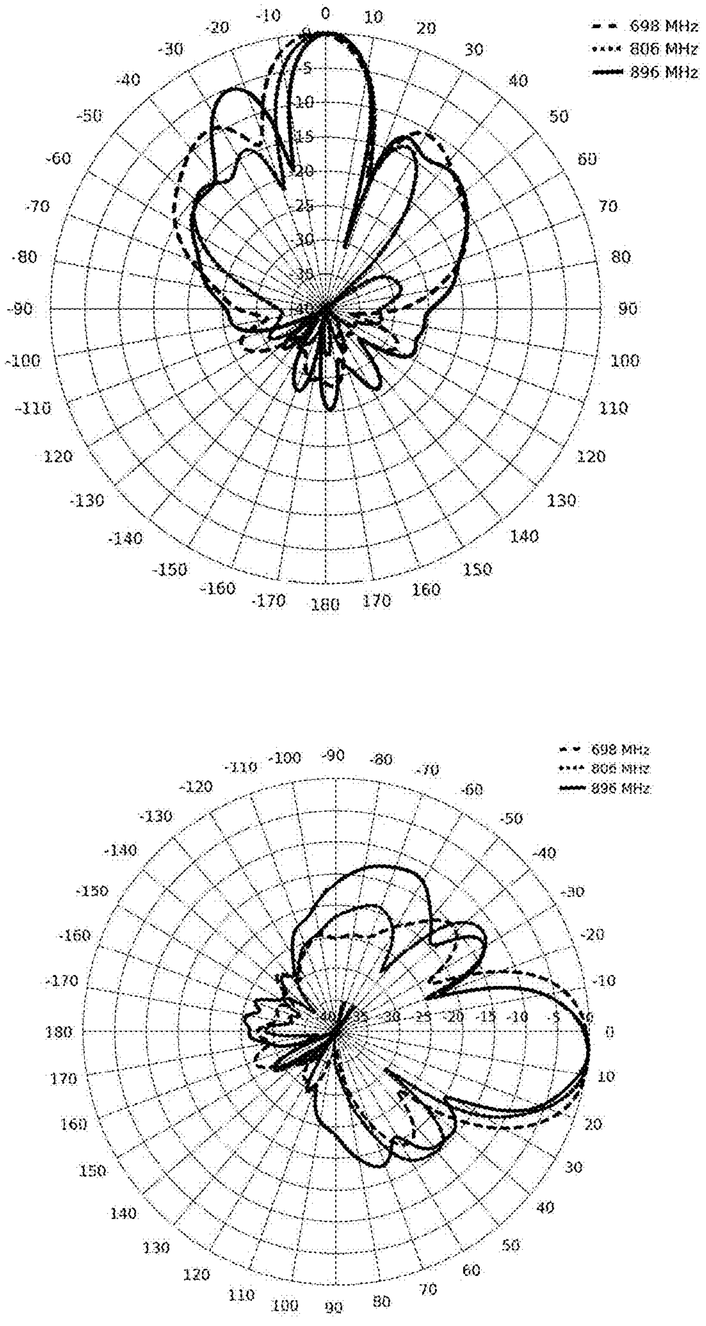
FIG. 15A shows the radiation pattern of LB antenna elements in the multi-band antenna array of FIG. 12A.
Figure 15B:
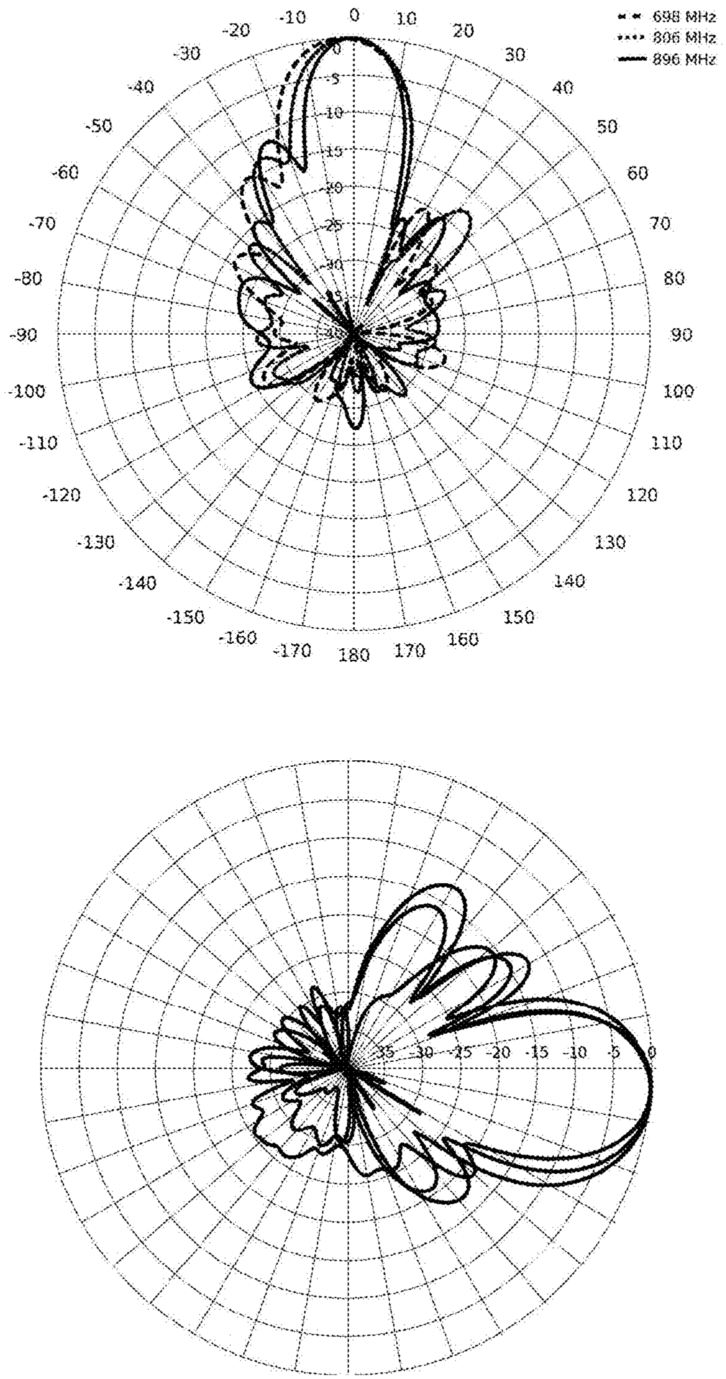
FIG. 15B shows the radiation pattern of LB antenna elements in the multi-band antenna array of FIG. 13A.

FIG. 15A shows azimuth and elevation plane radiation patterns for low-band antennas in the conventional array of FIG. 12A, while FIG. 15B shows azimuth and elevation plane radiation patterns for the low-band antennas of the modified array of FIG. 1A. As can be clearly seen, the side lobe level of the modified array is significantly improved over that of the conventional array.

Figure 16A:
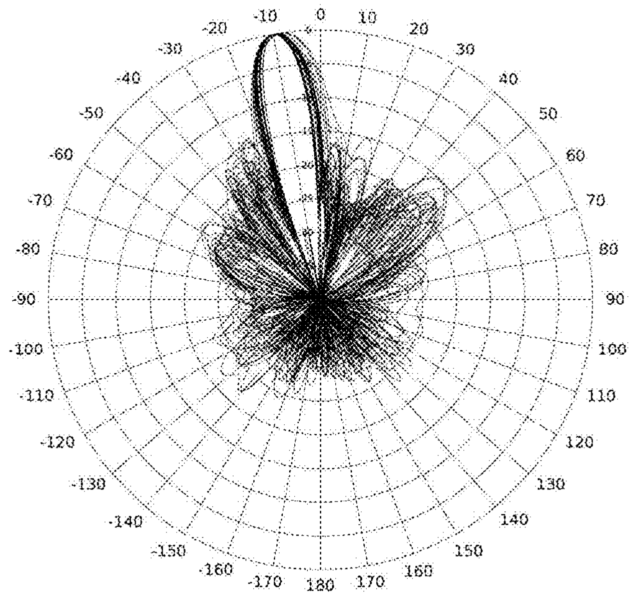
FIG. 16A shows the radiation pattern of MB antenna elements in the multi-band antenna array of FIG. 12A.
Figure 16A:
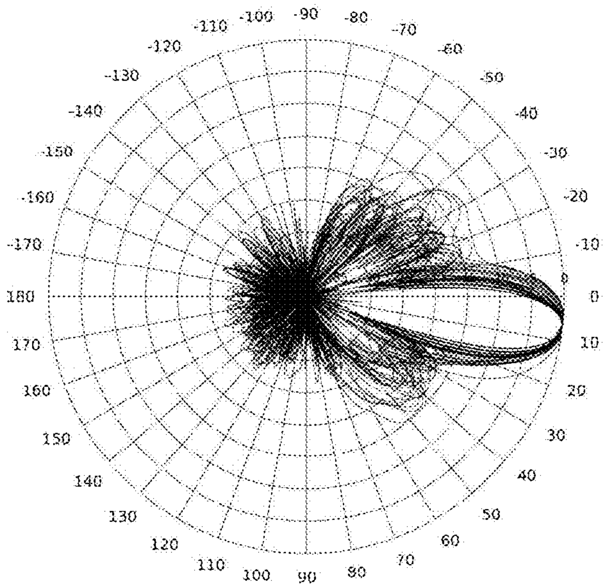
Figure 16B:
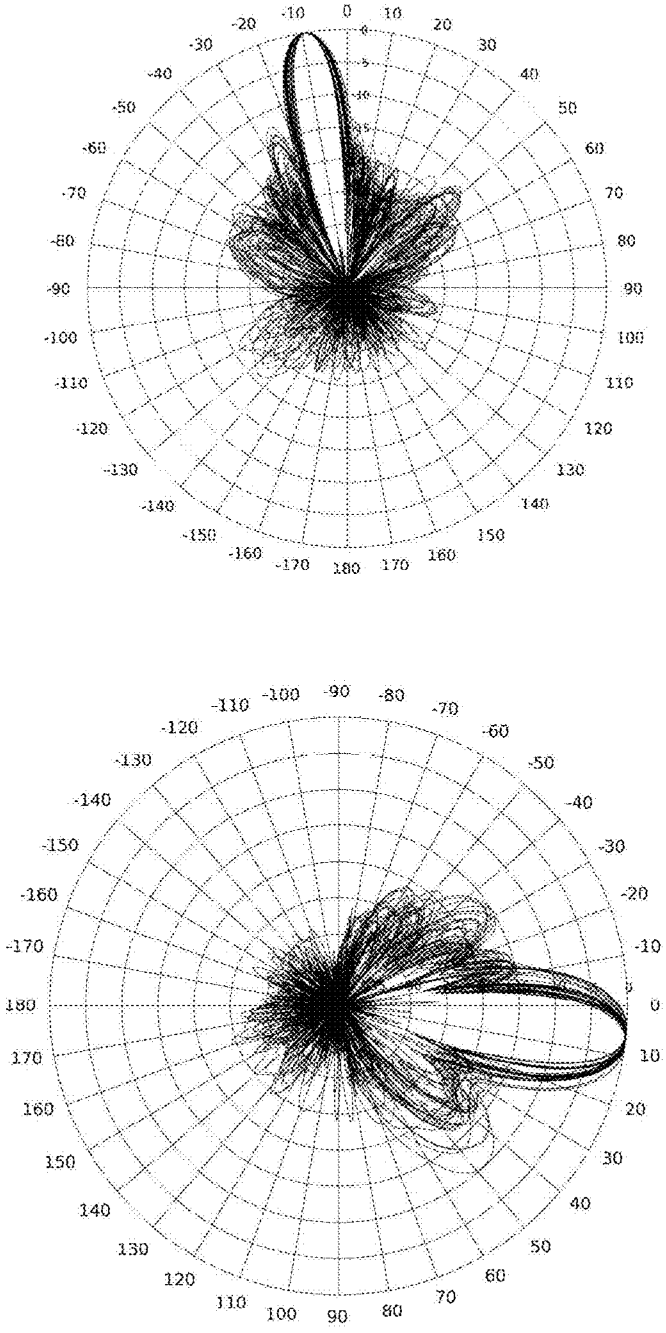
FIG. 16B shows the radiation pattern of MB antenna elements in the multi-band antenna array of FIG. 13A.

Similarly, FIG. 16A shows azimuth and elevation plane radiation patterns for mid-band antennas in the conventional array of FIG. 12A, while FIG. 16B shows azimuth and elevation plane radiation patterns for the mid-band antennas of the modified array of FIG. 13A. Again, it is evident that the side lobe level of the modified array is significantly improved over that of the conventional array.

Figure 17:
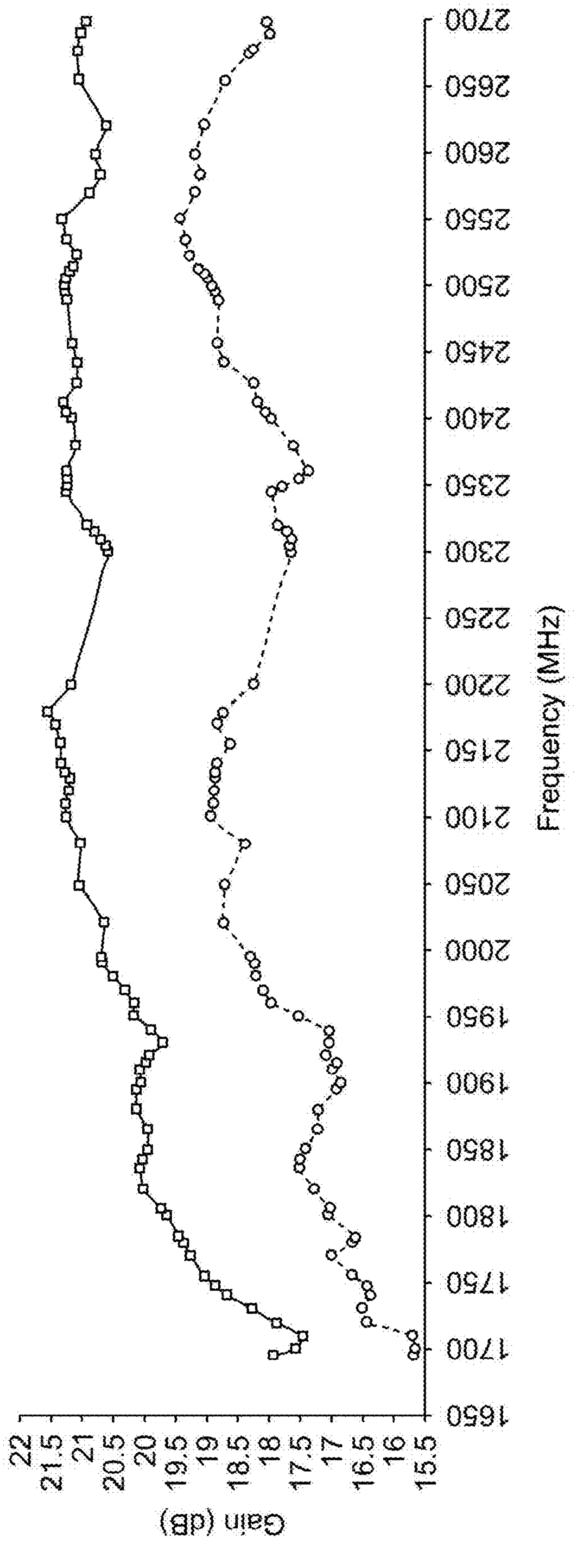
FIG. 17 is a plot comparing the gain of the MB elements of the multi-band antenna arrays of FIGS. 12A and 13.

Further, FIG. 17 shows that the mid-band array gain for the modified array of FIG. 13A (i.e., with spatial bandpass structures used on the low-band antennas) is improved by more than 1.5 dBi.

As noted above, for a better understanding of the present invention, the following references may be consulted. Each of these references is hereby incorporated by reference in its entirety:

[1] H.-H. Sun, C. Ding, H. Zhu, B. Jones, and Y. J. Guo, "Suppression of cross-band scattering in multiband antenna arrays," IEEE Trans. Antennas Propag., vol. 67, no. 4, pp. 2379-2389, April 2019.

[2] J. C. Soric, A. Monti, A. Toscano, F. Bilotti, and A. Ain, "Dual-polarized reduction of dipole antenna blockage using mantle cloaks," IEEE Trans. Antennas Propag., vol. 63, no. 11, pp. 4827-4834, November 2015.

[3] D. He, Q. Yu, Y. Chen, and S. Yang, "Dual-band shared-aperture base station antenna array with electromagnetic transparent antenna elements," IEEE Trans. Antennas Propag., vol. 69, no. 9, pp. 5596-5606, March 2021.

[4] US 2021/0242603 A1, "Multi-band base station antennas having broadband decoupling radiating elements and related radiating elements", Pub. Date Aug. 5, 2021.

[5] US 2021/0359414 A1, "Antenna Radiator With Pre-Configured Cloaking To Enable Dense Placement Of Radiators Of Multiple Bands", Pub. Date Nov. 18, 2021.

As used herein, the expression "at least one of [x] and [y]" means and should be construed as meaning "[x], [y], or both [x] and [y]".

A person understanding this invention may now conceive of alternative structures and embodiments or variations of the above all of which are intended to fall within the scope of the invention as defined in the claims that follow.

We claim:

1. An antenna comprising:

a central section; and a plurality of spatial band pass structures, wherein each of said plurality of spatial band pass structures comprises at least one parasitic patch and wherein each of said plurality of spatial band pass structures comprises a dipole arm extending from said central section, such that said plurality of spatial band pass structures together form a cross that defines four quadrants; and four parasitic radiators, each of said four parasitic radiators being positioned adjacent two of said dipole arms, such that each of said quadrants has only one of said parasitic radiators, wherein each of said parasitic radiators comprises a modified square loop.

2. The antenna according to claim 1, wherein each of said-plurality of spatial band pass structures comprises an LC resonator.

3. The antenna according to claim 1, wherein each of said plurality of spatial band pass structures further comprises at least one loop and wherein each at least one parasitic patch is disposed within a corresponding one of said—at least one loop.

4. The antenna according to claim 1, wherein the spatial band pass structures are embedded into radiating arms of said antenna.

5. The antenna according to claim 1, wherein the central section comprises at least one radiator.

6. The antenna according to claim 1, wherein at least two of said spatial band pass structures are of different designs.

7. The antenna according to claim 1, wherein said at least one parasitic patch has a shape that is at least one of: square, rectangular, polygonal, circular, lobular, and annular.

8. The antenna according to claim 1, wherein said at least one parasitic patch is at least one of: multilayer and single-layer.

9. The antenna according to claim 2, wherein said at least one loop has a shape that is at least one of: rectangular, square, polygonal, and arced.

10. The antenna according to claim 1, wherein said antenna is one of: a low-band antenna and a mid-band antenna.

* * * * *